United States Patent
Sidhu et al.

(10) Patent No.: US 9,429,657 B2
(45) Date of Patent: Aug. 30, 2016

(54) POWER EFFICIENT ACTIVATION OF A DEVICE MOVEMENT SENSOR MODULE

(75) Inventors: Gursharan S. Sidhu, Seattle, WA (US); Sharad Agarwal, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 303 days.

(21) Appl. No.: 13/325,065

(22) Filed: Dec. 14, 2011

(65) Prior Publication Data

US 2013/0158867 A1  Jun. 20, 2013

(51) Int. Cl.
*G01C 21/20* (2006.01)
*G01S 19/34* (2010.01)
*G01S 19/48* (2010.01)
*G01S 19/49* (2010.01)

(52) U.S. Cl.
CPC ............. *G01S 19/34* (2013.01); *G01S 19/48* (2013.01); *G01S 19/49* (2013.01)

(58) Field of Classification Search
CPC ........ G01S 19/45; G01S 19/46; G01S 19/47; G01S 19/48; G01S 19/49; G01C 21/12; G01C 21/28; G01C 21/20
USPC ........................................................ 701/472
See application file for complete search history.

(56) References Cited

U.S. PATENT DOCUMENTS

| | | |
|---|---|---|
| 4,357,593 A | 11/1982 | Von Tomkewitsch |
| 4,796,171 A | 1/1989 | Honey et al. |
| 4,796,191 A | 1/1989 | Honey et al. |
| 4,949,268 A | 8/1990 | Nishikawa et al. |
| 5,493,692 A | 2/1996 | Theimer et al. |
| 5,544,321 A | 8/1996 | Theimer et al. |
| 5,555,376 A | 9/1996 | Theimer et al. |
| 5,564,079 A | 10/1996 | Olsson |
| 5,592,173 A | 1/1997 | Lau et al. |
| 5,603,054 A | 2/1997 | Theimer et al. |

(Continued)

FOREIGN PATENT DOCUMENTS

| | | |
|---|---|---|
| CN | 1375999 A | 10/2002 |
| CN | 1488955 A | 4/2004 |

(Continued)

OTHER PUBLICATIONS

Lachapelle, Gerard, "GNSS Indoor Location Technologies", retrieved at <http://www.gmat.unsw.edu.au/wang/jgps/v3n12/v3n12p01.pdf>>, Journal of Global Positioning Systems, vol. 3, No. 1-2, Nov. 15, 2004, pp. 2-11.

(Continued)

*Primary Examiner* — Fadey Jabr
*Assistant Examiner* — Angelina Shudy
(74) *Attorney, Agent, or Firm* — Alin Corie; Sandy Swain; Micky Minhas

(57) ABSTRACT

The functionality described herein allows a user device to determine an appropriate juncture at which to initiate processing within a global navigation satellite system (GNSS) dead zone in an energy-efficient manner. In one implementation, the functionality employs a sensor management module for determining when to activate a device movement sensor module provided by a user device. When activated, the user device uses the device movement sensor module to perform any environment-specific processing, such as a dead-reckoning process for determining incremental positions within the venue. Further, in a crowd-sourcing application, the user device may report the incremental positions together with beacon information to remote processing functionality.

20 Claims, 13 Drawing Sheets

(56) References Cited

U.S. PATENT DOCUMENTS

| | | | |
|---|---|---|---|
| 5,611,050 A | 3/1997 | Theimer et al. |
| 5,623,194 A | 4/1997 | Boll et al. |
| 5,781,704 A | 7/1998 | Rossmo |
| 5,812,865 A | 9/1998 | Theimer et al. |
| 5,842,130 A | 11/1998 | Oprescu-Surcobe et al. |
| 5,845,227 A | 12/1998 | Peterson |
| 5,883,598 A | 3/1999 | Parl et al. |
| 5,943,621 A | 8/1999 | Ho et al. |
| 5,948,040 A * | 9/1999 | DeLorme | G01C 21/36 340/990 |
| 5,978,732 A | 11/1999 | Kakitani et al. |
| 6,052,598 A | 4/2000 | Rudrapatna et al. |
| 6,078,826 A | 6/2000 | Croft et al. |
| 6,116,363 A | 9/2000 | Frank |
| 6,122,572 A | 9/2000 | Yavnai |
| 6,175,805 B1 | 1/2001 | Abe |
| 6,292,687 B1 | 9/2001 | Lowell et al. |
| 6,313,786 B1 | 11/2001 | Sheynblat et al. |
| 6,314,347 B1 | 11/2001 | Kuroda et al. |
| 6,353,398 B1 | 3/2002 | Amin et al. |
| 6,381,522 B1 | 4/2002 | Watanabe et al. |
| 6,405,134 B1 | 6/2002 | Smith |
| 6,418,424 B1 | 7/2002 | Hoffberg et al. |
| 6,466,232 B1 | 10/2002 | Newell et al. |
| 6,480,783 B1 | 11/2002 | Myr |
| 6,490,519 B1 | 12/2002 | Lapidot et al. |
| 6,513,046 B1 | 1/2003 | Abbott, III et al. |
| 6,549,915 B2 | 4/2003 | Abbott, III et al. |
| 6,564,149 B2 | 5/2003 | Lai |
| 6,574,351 B1 | 6/2003 | Miyano |
| 6,577,946 B2 | 6/2003 | Myr |
| 6,603,405 B2 | 8/2003 | Smith |
| 6,615,130 B2 | 9/2003 | Myr |
| 6,668,227 B2 | 12/2003 | Hamada et al. |
| 6,672,506 B2 | 1/2004 | Swartz et al. |
| 6,678,525 B1 | 1/2004 | Baranger et al. |
| 6,721,572 B1 | 4/2004 | Smith et al. |
| 6,741,188 B1 | 5/2004 | Miller et al. |
| 6,747,675 B1 | 6/2004 | Abbott et al. |
| D494,584 S | 8/2004 | Schlieffers et al. |
| 6,791,580 B1 | 9/2004 | Abbott et al. |
| 6,796,505 B2 | 9/2004 | Pellaumail et al. |
| 6,799,047 B1 | 9/2004 | Bahl et al. |
| 6,801,223 B1 | 10/2004 | Abbott et al. |
| 6,807,483 B1 | 10/2004 | Chao et al. |
| 6,812,937 B1 | 11/2004 | Abbott et al. |
| 6,837,436 B2 | 1/2005 | Swartz et al. |
| 6,842,877 B2 | 1/2005 | Robarts et al. |
| 6,845,324 B2 | 1/2005 | Smith |
| RE38,724 E | 4/2005 | Peterson |
| 6,889,382 B1 | 5/2005 | Anderson |
| 6,925,378 B2 | 8/2005 | Tzamaloukas |
| 6,992,625 B1 | 1/2006 | Krumm et al. |
| 7,010,501 B1 | 3/2006 | Roslak et al. |
| 7,040,541 B2 | 5/2006 | Swartz et al. |
| 7,054,938 B2 | 5/2006 | Sundqvist et al. |
| 7,058,506 B2 | 6/2006 | Kawase et al. |
| 7,063,263 B2 | 6/2006 | Swartz et al. |
| 7,084,762 B2 | 8/2006 | Pedrazzini et al. |
| 7,096,030 B2 | 8/2006 | Huomo |
| 7,116,987 B2 | 10/2006 | Spain, Jr. et al. |
| 7,116,988 B2 | 10/2006 | Dietrich et al. |
| 7,127,213 B2 | 10/2006 | Haymes et al. |
| 7,130,743 B2 | 10/2006 | Kudo et al. |
| 7,161,914 B2 | 1/2007 | Shoaib et al. |
| 7,162,367 B2 | 1/2007 | Lin et al. |
| 7,171,378 B2 | 1/2007 | Petrovich et al. |
| 7,195,157 B2 | 3/2007 | Swartz et al. |
| 7,200,394 B2 | 4/2007 | Aoki et al. |
| 7,215,969 B2 | 5/2007 | Benco et al. |
| 7,233,861 B2 | 6/2007 | Van Buer et al. |
| 7,250,907 B2 | 7/2007 | Krumm et al. |
| 7,321,774 B1 | 1/2008 | Lau et al. |
| 7,359,713 B1 | 4/2008 | Tiwari |
| 7,385,501 B2 | 6/2008 | Miller et al. |
| 7,433,696 B2 | 10/2008 | Dietrich et al. |
| 7,463,890 B2 | 12/2008 | Herz et al. |
| 7,512,462 B2 | 3/2009 | Nichols et al. |
| 7,565,157 B1 | 7/2009 | Ortega et al. |
| 7,590,589 B2 | 9/2009 | Hoffberg |
| 7,617,042 B2 | 11/2009 | Horvitz et al. |
| 7,630,986 B1 | 12/2009 | Herz et al. |
| 7,636,707 B2 | 12/2009 | Chaudhuri et al. |
| 7,698,055 B2 | 4/2010 | Horvitz et al. |
| 7,705,728 B2 | 4/2010 | Mock et al. |
| 7,706,964 B2 | 4/2010 | Horvitz et al. |
| 7,739,040 B2 | 6/2010 | Horvitz |
| 7,778,440 B2 | 8/2010 | Malone |
| 7,796,944 B2 | 9/2010 | Eaton et al. |
| 7,796,966 B2 | 9/2010 | Bhattacharya et al. |
| 7,813,870 B2 | 10/2010 | Downs et al. |
| 7,856,234 B2 | 12/2010 | Alizadeh-Shabdiz et al. |
| 7,864,048 B1 | 1/2011 | Cope et al. |
| 7,873,368 B2 | 1/2011 | Goren |
| 7,899,611 B2 | 3/2011 | Downs et al. |
| 7,912,628 B2 | 3/2011 | Chapman et al. |
| 7,925,426 B2 | 4/2011 | Koebler et al. |
| 7,961,651 B2 | 6/2011 | Kim et al. |
| 7,962,156 B2 | 6/2011 | Robertson |
| 7,991,718 B2 | 8/2011 | Horvitz et al. |
| 8,024,112 B2 | 9/2011 | Krumm et al. |
| 8,090,530 B2 | 1/2012 | Horvitz |
| 8,126,641 B2 | 2/2012 | Horvitz |
| 8,155,872 B2 | 4/2012 | Kjeldsen et al. |
| 8,165,773 B1 | 4/2012 | Chavez et al. |
| 8,174,447 B2 | 5/2012 | Loidl et al. |
| 8,180,366 B2 | 5/2012 | Ernst et al. |
| 8,190,362 B2 | 5/2012 | Barker et al. |
| 8,228,234 B2 | 7/2012 | Paulson |
| 8,244,272 B2 | 8/2012 | Morgan et al. |
| 8,255,275 B2 | 8/2012 | Collopy et al. |
| 8,260,481 B2 | 9/2012 | Naik et al. |
| 8,311,730 B2 | 11/2012 | Neff |
| 8,320,939 B1 | 11/2012 | Vincent |
| 8,433,334 B2 | 4/2013 | Huang et al. |
| 8,433,512 B1 * | 4/2013 | Lopatenko et al. | 701/426 |
| 8,443,662 B2 | 5/2013 | Lane et al. |
| 8,463,545 B2 | 6/2013 | Boore |
| 8,484,113 B2 | 7/2013 | Collopy et al. |
| 8,519,860 B2 | 8/2013 | Johnson et al. |
| 8,532,670 B2 | 9/2013 | Kim |
| 8,538,686 B2 | 9/2013 | Gruen et al. |
| 8,560,218 B1 | 10/2013 | Kahn et al. |
| 8,565,783 B2 | 10/2013 | Yang et al. |
| 8,566,029 B1 * | 10/2013 | Lopatenko et al. | 701/426 |
| 8,589,065 B2 * | 11/2013 | Scofield et al. | 701/400 |
| 8,620,692 B2 | 12/2013 | Collopy et al. |
| 8,639,803 B2 | 1/2014 | Moritz et al. |
| 8,712,931 B1 | 4/2014 | Wahlen |
| 8,751,146 B2 | 6/2014 | Shrivathsan et al. |
| 8,762,053 B1 * | 6/2014 | Lehman | 701/438 |
| 8,788,606 B2 | 7/2014 | Johnson et al. |
| 8,825,381 B2 | 9/2014 | Tang |
| 8,898,002 B2 * | 11/2014 | Barrett | G01C 21/32 340/995.12 |
| 8,981,995 B2 | 3/2015 | Schlesinger et al. |
| 8,990,333 B2 | 3/2015 | Johnson et al. |
| 9,134,137 B2 | 9/2015 | Brush et al. |
| 2001/0029425 A1 | 10/2001 | Myr |
| 2001/0030664 A1 | 10/2001 | Shulman et al. |
| 2001/0040590 A1 | 11/2001 | Abbott et al. |
| 2001/0040591 A1 | 11/2001 | Abbott et al. |
| 2001/0043231 A1 | 11/2001 | Abbott et al. |
| 2001/0043232 A1 | 11/2001 | Abbott et al. |
| 2002/0032689 A1 | 3/2002 | Abbott, III et al. |
| 2002/0044152 A1 | 4/2002 | Abbott, III et al. |
| 2002/0050944 A1 | 5/2002 | Sheynblat et al. |
| 2002/0052930 A1 | 5/2002 | Abbott et al. |
| 2002/0052963 A1 | 5/2002 | Abbott et al. |
| 2002/0054130 A1 | 5/2002 | Abbott, III et al. |
| 2002/0054174 A1 | 5/2002 | Abbott et al. |
| 2002/0067289 A1 | 6/2002 | Smith |
| 2002/0078204 A1 | 6/2002 | Newell et al. |
| 2002/0080155 A1 | 6/2002 | Abbott et al. |

(56) References Cited

U.S. PATENT DOCUMENTS

| | | |
|---|---|---|
| 2002/0080156 A1 | 6/2002 | Abbott et al. |
| 2002/0083025 A1 | 6/2002 | Robarts et al. |
| 2002/0083158 A1 | 6/2002 | Abbott et al. |
| 2002/0087525 A1 | 7/2002 | Abbott et al. |
| 2002/0099817 A1 | 7/2002 | Abbott et al. |
| 2002/0107618 A1 | 8/2002 | Deguchi et al. |
| 2003/0036842 A1 | 2/2003 | Hancock |
| 2003/0042051 A1 | 3/2003 | Kriger |
| 2003/0046401 A1 | 3/2003 | Abbott et al. |
| 2003/0069683 A1 | 4/2003 | Lapidot et al. |
| 2003/0135304 A1 | 7/2003 | Sroub et al. |
| 2003/0139863 A1 | 7/2003 | Toda et al. |
| 2003/0140088 A1 | 7/2003 | Robinson et al. |
| 2003/0153338 A1 | 8/2003 | Herz et al. |
| 2003/0154009 A1 | 8/2003 | Basir et al. |
| 2003/0154476 A1 | 8/2003 | Abbott, III et al. |
| 2003/0195700 A1 | 10/2003 | Hamada et al. |
| 2003/0229471 A1 | 12/2003 | Guralnik et al. |
| 2003/0229895 A1 | 12/2003 | Jasinschi et al. |
| 2004/0019603 A1 | 1/2004 | Haigh et al. |
| 2004/0068364 A1 | 4/2004 | Zhao et al. |
| 2004/0090121 A1 | 5/2004 | Simonds et al. |
| 2004/0090346 A1 | 5/2004 | Simonds et al. |
| 2004/0092253 A1 | 5/2004 | Simonds et al. |
| 2004/0093154 A1 | 5/2004 | Simonds et al. |
| 2004/0093155 A1 | 5/2004 | Simonds et al. |
| 2004/0128066 A1 | 7/2004 | Kudo et al. |
| 2004/0153445 A1 | 8/2004 | Horvitz et al. |
| 2004/0166877 A1 | 8/2004 | Spain et al. |
| 2004/0176211 A1 | 9/2004 | Kitajima et al. |
| 2004/0180671 A1 | 9/2004 | Spain |
| 2004/0181340 A1 | 9/2004 | Smith |
| 2004/0189475 A1 | 9/2004 | Cooper et al. |
| 2004/0201500 A1 | 10/2004 | Miller et al. |
| 2004/0230374 A1* | 11/2004 | Tzamaloukas ............... 701/217 |
| 2004/0260457 A1 | 12/2004 | Kawase et al. |
| 2004/0268403 A1 | 12/2004 | Krieger et al. |
| 2005/0021417 A1 | 1/2005 | Kassan |
| 2005/0034078 A1 | 2/2005 | Abbott et al. |
| 2005/0037775 A1 | 2/2005 | Moeglein et al. |
| 2005/0046584 A1 | 3/2005 | Breed |
| 2005/0048946 A1* | 3/2005 | Holland et al. ............ 455/404.1 |
| 2005/0049900 A1 | 3/2005 | Hirose et al. |
| 2005/0062643 A1 | 3/2005 | Pande et al. |
| 2005/0086004 A1 | 4/2005 | Smith |
| 2005/0125148 A1 | 6/2005 | Van Buer et al. |
| 2005/0131607 A1 | 6/2005 | Breed |
| 2005/0144318 A1 | 6/2005 | Chang |
| 2005/0149253 A1 | 7/2005 | Nambata |
| 2005/0197775 A1 | 9/2005 | Smith |
| 2005/0219120 A1 | 10/2005 | Chang |
| 2005/0228553 A1* | 10/2005 | Tryon ...................... B60K 6/46 701/22 |
| 2005/0240378 A1 | 10/2005 | Smith |
| 2005/0261004 A1 | 11/2005 | Dietrich et al. |
| 2005/0266858 A1 | 12/2005 | Miller et al. |
| 2005/0272442 A1 | 12/2005 | Miller et al. |
| 2005/0283503 A1 | 12/2005 | Hancock et al. |
| 2006/0015254 A1 | 1/2006 | Smith |
| 2006/0019676 A1 | 1/2006 | Miller et al. |
| 2006/0022048 A1 | 2/2006 | Johnson |
| 2006/0167784 A1 | 7/2006 | Hoffberg |
| 2006/0241862 A1 | 10/2006 | Ichihara et al. |
| 2006/0256005 A1 | 11/2006 | Thandu et al. |
| 2006/0264211 A1* | 11/2006 | Kalhan et al. ............... 455/425 |
| 2006/0284765 A1 | 12/2006 | Bernhardt et al. |
| 2006/0286988 A1 | 12/2006 | Blume et al. |
| 2006/0287813 A1* | 12/2006 | Quigley ...................... 701/201 |
| 2007/0008927 A1 | 1/2007 | Herz et al. |
| 2007/0042790 A1 | 2/2007 | Mohi et al. |
| 2007/0073477 A1 | 3/2007 | Krumm et al. |
| 2007/0073832 A1 | 3/2007 | Curtis et al. |
| 2007/0091037 A1 | 4/2007 | Lee |
| 2007/0106465 A1 | 5/2007 | Adam et al. |
| 2007/0115174 A1 | 5/2007 | Herrick |
| 2007/0179792 A1* | 8/2007 | Kramer ........................... 705/1 |
| 2007/0208495 A1* | 9/2007 | Chapman ............. G08G 1/0104 701/117 |
| 2008/0005172 A1 | 1/2008 | Gutmann |
| 2008/0018529 A1 | 1/2008 | Yoshioka |
| 2008/0070593 A1 | 3/2008 | Altman et al. |
| 2008/0077326 A1* | 3/2008 | Funk et al. .................... 701/220 |
| 2008/0090591 A1 | 4/2008 | Miller et al. |
| 2008/0091537 A1 | 4/2008 | Miller et al. |
| 2008/0104225 A1 | 5/2008 | Zhang et al. |
| 2008/0129598 A1 | 6/2008 | Godefroy et al. |
| 2008/0161018 A1 | 7/2008 | Miller et al. |
| 2008/0180637 A1 | 7/2008 | Kjeldsen et al. |
| 2008/0191941 A1 | 8/2008 | Saban et al. |
| 2008/0234935 A1 | 9/2008 | Wolf et al. |
| 2008/0248815 A1 | 10/2008 | Busch |
| 2008/0249667 A1 | 10/2008 | Horvitz |
| 2008/0268870 A1 | 10/2008 | Houri |
| 2008/0305808 A1 | 12/2008 | Chan et al. |
| 2008/0311947 A1 | 12/2008 | Soerensen et al. |
| 2008/0319658 A1 | 12/2008 | Horvitz et al. |
| 2008/0319660 A1 | 12/2008 | Horvitz et al. |
| 2009/0005061 A1 | 1/2009 | Ward et al. |
| 2009/0009397 A1* | 1/2009 | Taylor et al. .................. 342/451 |
| 2009/0043504 A1 | 2/2009 | Bandyopadhyay et al. |
| 2009/0051566 A1 | 2/2009 | Olsen et al. |
| 2009/0063038 A1 | 3/2009 | Shrivathsan et al. |
| 2009/0143082 A1 | 6/2009 | Begaja et al. |
| 2009/0149155 A1 | 6/2009 | Grossman |
| 2009/0184849 A1 | 7/2009 | Nasiri |
| 2009/0191892 A1 | 7/2009 | Kelley |
| 2009/0192709 A1* | 7/2009 | Yonker et al. ................ 701/215 |
| 2009/0201896 A1 | 8/2009 | Davis et al. |
| 2009/0248301 A1 | 10/2009 | Judd et al. |
| 2009/0312032 A1* | 12/2009 | Bornstein et al. ......... 455/456.1 |
| 2010/0010733 A1 | 1/2010 | Krumm et al. |
| 2010/0039929 A1 | 2/2010 | Cho |
| 2010/0070334 A1 | 3/2010 | Monteverde |
| 2010/0079332 A1 | 4/2010 | Garin |
| 2010/0079334 A1 | 4/2010 | Roh et al. |
| 2010/0082247 A1 | 4/2010 | Klein et al. |
| 2010/0087230 A1 | 4/2010 | Peh et al. |
| 2010/0097269 A1 | 4/2010 | Loidl et al. |
| 2010/0127926 A1 | 5/2010 | Wang |
| 2010/0131308 A1 | 5/2010 | Collopy et al. |
| 2010/0153007 A1 | 6/2010 | Crowley |
| 2010/0156708 A1 | 6/2010 | Chen |
| 2010/0161179 A1 | 6/2010 | McClure et al. |
| 2010/0176992 A1 | 7/2010 | T'siobbel |
| 2010/0185388 A1 | 7/2010 | Horvitz |
| 2010/0231383 A1 | 9/2010 | Levine et al. |
| 2010/0250133 A1 | 9/2010 | Buros |
| 2010/0255856 A1 | 10/2010 | Kansal et al. |
| 2010/0255858 A1 | 10/2010 | Juhasz |
| 2010/0310071 A1 | 12/2010 | Malone et al. |
| 2010/0323715 A1 | 12/2010 | Winders et al. |
| 2010/0324813 A1 | 12/2010 | Sundararajan et al. |
| 2010/0332125 A1 | 12/2010 | Tan et al. |
| 2011/0035142 A1 | 2/2011 | Tang |
| 2011/0039573 A1 | 2/2011 | Hardie |
| 2011/0050493 A1 | 3/2011 | Torimoto et al. |
| 2011/0071759 A1 | 3/2011 | Pande et al. |
| 2011/0148623 A1 | 6/2011 | Bishop et al. |
| 2011/0151839 A1 | 6/2011 | Bolon et al. |
| 2011/0151898 A1 | 6/2011 | Chandra et al. |
| 2011/0163914 A1 | 7/2011 | Seymour |
| 2011/0169632 A1 | 7/2011 | Walker et al. |
| 2011/0171024 A1 | 7/2011 | Jensen |
| 2011/0178708 A1 | 7/2011 | Zhang et al. |
| 2011/0182238 A1 | 7/2011 | Marshall et al. |
| 2011/0184644 A1* | 7/2011 | McBurney et al. ........... 701/208 |
| 2011/0191024 A1* | 8/2011 | DeLuca ....................... 701/216 |
| 2011/0191052 A1 | 8/2011 | Lin et al. |
| 2011/0197200 A1 | 8/2011 | Huang et al. |
| 2011/0207471 A1* | 8/2011 | Murray et al. ............. 455/456.1 |
| 2011/0208430 A1 | 8/2011 | Tun et al. |
| 2011/0212732 A1 | 9/2011 | Garrett et al. |
| 2011/0238289 A1 | 9/2011 | Lehmann et al. |
| 2011/0238308 A1 | 9/2011 | Miller et al. |

(56) References Cited

U.S. PATENT DOCUMENTS

| | | | |
|---|---|---|---|
| 2011/0246059 A1 | 10/2011 | Tokashiki | |
| 2011/0270940 A1 | 11/2011 | Johnson | |
| 2011/0282571 A1 | 11/2011 | Krumm et al. | |
| 2011/0291886 A1 | 12/2011 | Krieter | |
| 2011/0306323 A1 | 12/2011 | Do et al. | |
| 2011/0319094 A1 | 12/2011 | Usui et al. | |
| 2012/0052873 A1 | 3/2012 | Wong | |
| 2012/0089322 A1 | 4/2012 | Horvitz | |
| 2012/0121161 A1 | 5/2012 | Eade et al. | |
| 2012/0129546 A1 | 5/2012 | Yang et al. | |
| 2012/0158289 A1 | 6/2012 | Brush et al. | |
| 2012/0173139 A1 | 7/2012 | Judd et al. | |
| 2012/0176491 A1 | 7/2012 | Garin et al. | |
| 2012/0188124 A1 | 7/2012 | Reidevall et al. | |
| 2012/0209507 A1 | 8/2012 | Serbanescu | |
| 2012/0218142 A1* | 8/2012 | Leclercq | 342/357.3 |
| 2012/0221244 A1 | 8/2012 | Georgy et al. | |
| 2012/0238293 A9* | 9/2012 | Pan et al. | 455/456.2 |
| 2012/0259541 A1 | 10/2012 | Downey et al. | |
| 2012/0259666 A1 | 10/2012 | Collopy et al. | |
| 2012/0290615 A1 | 11/2012 | Lamb et al. | |
| 2012/0299724 A1 | 11/2012 | Kuper et al. | |
| 2013/0002857 A1 | 1/2013 | Kulik | |
| 2013/0018581 A1 | 1/2013 | Sidhu et al. | |
| 2013/0018629 A1 | 1/2013 | Sidhu et al. | |
| 2013/0030690 A1* | 1/2013 | Witmer | G01C 21/32 701/409 |
| 2013/0035111 A1 | 2/2013 | Moeglein et al. | |
| 2013/0095848 A1 | 4/2013 | Gold et al. | |
| 2013/0114687 A1 | 5/2013 | Kim et al. | |
| 2013/0115971 A1 | 5/2013 | Marti et al. | |
| 2013/0116921 A1* | 5/2013 | Kasargod et al. | 701/472 |
| 2013/0138314 A1* | 5/2013 | Viittala et al. | 701/70 |
| 2013/0211711 A1 | 8/2013 | Kelly et al. | |
| 2013/0285849 A1 | 10/2013 | Ben-Moshe | |
| 2013/0297204 A1* | 11/2013 | Bartels | 701/495 |
| 2014/0024354 A1 | 1/2014 | Haik et al. | |
| 2014/0070991 A1 | 3/2014 | Zhong et al. | |
| 2014/0121960 A1* | 5/2014 | Park | 701/494 |
| 2014/0327547 A1 | 11/2014 | Johnson | |
| 2015/0018008 A1 | 1/2015 | Schlesinger et al. | |
| 2015/0073697 A1* | 3/2015 | Barrett et al. | 701/409 |
| 2015/0339397 A1 | 11/2015 | Brush et al. | |

FOREIGN PATENT DOCUMENTS

| | | |
|---|---|---|
| CN | 101109808 A | 1/2008 |
| CN | 101251589 A | 8/2008 |
| CN | 102006550 A | 4/2011 |
| CN | 102204374 A | 9/2011 |
| CN | 101675597 A | 2/2014 |
| DE | 10042983 A1 | 3/2002 |
| EP | 2293016 A2 | 3/2011 |
| GB | 2431261 A | 4/2007 |
| JP | 04-364491 | 12/1992 |
| JP | 2007-083678 | 3/1995 |
| JP | 2008-271277 | 10/1996 |
| JP | 10132593 A | 5/1998 |
| JP | 2011-153446 | 8/1999 |
| JP | 2002-328035 | 11/2002 |
| JP | 2004-317160 | 11/2004 |
| KR | 19970071404 | 11/1997 |
| KR | 20040033141 A | 4/2004 |
| KR | 20040050550 A | 6/2004 |
| RU | 8141 | 10/1998 |
| WO | WO 9800787 | 1/1998 |
| WO | 2009/016505 A2 | 2/2009 |
| WO | 2009039161 A2 | 3/2009 |
| WO | 2012085876 A2 | 6/2012 |

OTHER PUBLICATIONS

Toledo-Moreo, et al., "Performance Aspects of Navigation Systems for GNSS-Based Road User Charging," retrieved at <<http://ants.inf.um.es/~josesanta/doc/ION_GNSS10.pdf>>, Proceedings of the 23rd International Technical Meeting of the Satellite Division of the Institute of Navigation (ION GNSS), Sep. 21-24, 2010, pp. 1157-1165.

Collin, et al., "Indoor positioning System Using Accelerometry and High Accuracy Heading Sensors," retrieved at <<http://plan.geomatics.ucalgary.ca/papers/gps03jussic.pdf>>, Proceedings of the 16th International Technical Meeting of the Satellite Division of The Institute of Navigation, ION GPS/GNSS Conference (Session C3), Sep. 2003, pp. 1-7.

Wendlandt, et al., "Continuous location and direction estimation with multiple sensors using particle filtering," retrieved at <<http://ieeexplore.ieee.org/stamp/stamp.jsp?arnumber=04042026>>, IEEE International Conference on Multisensor Fusion and Integration for Intelligent Systems, Sep. 2006, pp. 92-97.

Toledo-Moreo, et al., "Lane-Level Integrity Provision for Navigation and Map Matching With GNSS, Dead Reckoning, and Enhanced Maps," retrieved at <<http://ieeexplore.ieee.org/stamp/stamp.jsp?tp=&arnumber=5286855>>, IEEE Transactions on Intelligent Transportation Systems, vol. 11, No. 1, Mar. 2010, pp. 100-112.

Chun, et al., "CloneCloud: Elastic Execution between Mobile Device and Cloud," retrieved at <<http://eurosys2011.cs.uni-salzburg.at/pdf/eurosys2011-chun.pdf>>, Proceedings of the Sixth Conference on Computer Systems (EuroSys'11 ), Apr. 2011, pp. 301-314.

Cabero, et al., "Indoor People Tracking Based on Dynamic Weighted MultiDimensional Scaling," retrieved at <<http://www.ri.cmu.edu/pub_files/pub4/maria_cabero_jose_2007_1/maria_cabero_jose_2007_1.pdf>>, MSWIM '07, Proceedings of the 10th ACM Symposium on Modeling, Analysis, and Simulation of Wireless and Mobile Systems, Oct. 2007, 8 pages.

De Moraes, et al., "Calibration-Free WLAN Location System Based on Dynamic Mapping of Signal Strength," retrieved at <<http//:www.ravel.ufrj.br/arquivosPublicacoes/WAC11-demoraes.pdf>>, MobiWac '06, Proceedings of the 4th ACM International Workshop on Mobility Management and Wireless Access, Oct. 2006, 8 pages.

Goyal, Vishal, "MEMS Based Motion Sensing Design," retrieved at <<http://www.eeherald.com/section/design-guide/mems_application.html>>, retrieved on Mar. 30, 2011, Electronics Engineering Herald, 2006, 2 pages.

Jimenez, et al., "A Comparison of Pedestrian Dead-Reckoning Algorithms using a Low-Cost MEMS IMU," retrieved at <<http://www.iai.csic.es/users/fseco/papers/WISP2009Jimenez.pdf>>, WISP 2009, 6th IEEE International Symposium on Intelligent Signal Processing, Aug. 2009, pp. 37-42.

Jin, et al., "A Robust Dead-Reckoning Pedestrian Tracking System with Low Cost Sensors," retried at <<http://www.ami-lab.org/uploads/Publications/Conference/WP2/Robust%20Dead-Reckoning%20Pedestrian%20Tracking%20System%20with%20Low%20Cost%20Sensors.pdf>>, 2011 IEEE International Conference on Pervasive Computing and Communications (PerCom), Mar. 21-25, 2011, pp. 222-230.

Koyuncu, et al., "A Survey of Indoor Positioning and Object Locating Systems," retrieved at <<http://paper.ijcsns.org/07_book/201005/20100518.pdf>>, IJCSNS International Journal of Computer Science and Network Security, vol. 10, No. 5, May 2010, pp. 121-128.

Paul, et al., "Wi-Fi Based Indoor Localization and Tracking Using Sigma-Point Kalman Filtering Methods," retrieved at <<http//:www.cse.ogi.edu/~anindya/Paul_Wan_Plans08.pdf>>, IEEE/ION Position, Location and Navigation Symposium, May 2008, 14 pages.

Rogoleva, Luba, "Crowdsourcing Location Information to Improve Indoor Localization," retrieved at <<http://ecollection.ethbib.ethz.ch/eserv/eth:1224/eth-1224-01.pdf>>, Master Thesis, Eidgenossiche Technische Hochschule Zurich, Apr. 30, 2010, 91 pages.

Shin, et al., "Sit-Down and Stand-Up Awareness Algorithm for the Pedestrian Dead Reckoning," retrieved at <<http://sspace.snu.ac.kr/bitstream/10371/27736/1/Sit-Down%20&%020Stand-Up%20Awareness%20Algorithm%20for%20the%20Pedestrian%20Dead%20Reckoning.pdf>>, GNSS '09, May 2009, 6 pages.

(56) References Cited

OTHER PUBLICATIONS

Xuan, et al., "Crowd Sourcing Indoor Maps with Mobile Sensors," retrieved at <<http://www.ocf.berkeley.edu/~xuanyg/IndoorMap_Mobiquitous2010_ver2.pdf>>, 7th International ICST Conference on Mobile and Ubiquitous Systems (Mobiquitous 2010), Dec. 2010, 12 pages.
Zhu, et al-, "Indoor/Outdoor Location of Cellular Handsets Based on Received Signal Strength," retrieved at <<http://ieeexplore.ieee.org/stamp/stamp.jsp?arnumber=01543256>>, Electronics Letters, vol. 41, No. 1, 2 pages.
Gusenbauer, et al., "Self-Contained Indoor Positioning on Off-The-Shelf Mobile Devices," retrieved at <<http://ieeexplore.ieee.org/stamp/stamp.jsp?arnumber=05646681>>, International Conference on Indoor Positioning and Indoor Navigation (IPIN), Sep. 2010, 9 pages.
Sidhu, et al., "Multi-Stage Dead Reckoning for Crowd Sourcing," U.S. Appl. No. 13/284,128, filed Oct. 28, 2011, 42 pages.
Sidhu, et al., "Activating and Deactivating Sensors for Dead Reckoning," U.S. Appl. No. 13/183,050, filed Jul. 14, 2011, 48 pages.
Sidhu, et al., "Crowd Sourcing Based on Dead Reckoning," U.S. Appl. No. 13/183,124, filed Jul. 14, 2011, 48 pages.
Yang, et al., "Path Progression Matching for Indoor Positioning Systems," U.S. Appl. No. 12/954,545, filed Nov. 24, 2010, 43 pages.
Goyal, Vishal, "MEMS based motion sensing design," retrieved at <<http://www.eeherald.com/section/design-guide/mems_application.html>>, EE Herald, retrieved Jul. 9, 2012, 2 pages.
Beard, K., et al., "Estimating positions and paths of moving objects", Temporal Representation and Reasoning, 2000. TIME 2000. Proceedings. Seventh International Workshop on; Digital Object Identifier: 10.1109/TIME.2000.856597 Publication Year: 2000, pp. 155-162.
Billinghurst, Mark, et al., "An Evaluation of Wearable Information Spaces", Proceedings of the Virtual Reality Annual International Symposium, 1998, 8 pages.
Billinghurst, Mark, et al., "Research Directions in Wearable Computing", University of Washington, May, 1998, 48 pages.
Billinghurst, Mark, et al., "Wearable Devices: New Ways to Manage Information", IEEE Computer Society, Jan. 1999, pp. 57-64.
Chen, Guanling, et al., "A Survey of Context-Aware Mobile Computing Research," Dartmouth Computer Science Technical Report, 2000, 16 pages.
Choi, Jae-Hyeong,et al., "Performance evaluation of traffic control based on geographical information", Intelligent Computing and Intelligent Systems, 2009. ICIS 2009. IEEE International Conference on; vol. 3; Publication Year: 2009, pp. 85-89.
Harter, Andy, et al., "A Distributed Location System for the Active Office," IEEE Network, 1994, pp. 62-70.
Horvitz, Eric, et al., "Attention-Sensitive Alerting in Computing Systems", Microsoft Research, Aug. 1999.
Horvitz, Eric, et al., "In Pursuit of Effective Handsfree Decision Support: Coupling Bayesian Inference", Speech Understanding, and User Models,1995, 8 pages.
Joachims, T., "Text categorization with support vector machines: learning with many relevant features", Machine Learning, European Conference on Machine Learning, Apr. 21, 1998, pp. 137-142.
Kostov, V., et al., "Travel destination prediction using frequent crossing pattern from driving history", Intelligent transportation Systems, 2005. Proceedings. 2005 IEEE; Digital Object Identifier: 10.1109/ITSC.2005.1520182 Publication Year: 2005, pp. 343-350.
Krumm, "Predestination: Where Do You Want to Go Today?"; Computer; vol. 40, Issue 4; Apr. 2007; pp. 105-107.
Lee, Junghoon, et al., "Design and implementation of a movement history analysis frame-work for the Taxi telematics system", Communications, 2008. APCC 2008. 14th Asia-Pacific Conference on; Publication Year: 2008, pp. 1-4.
Liu, Feng, et al., "Remaining Delivery Time Estimation Based Routing for Intermittently Connected Mobile Networks", Distributed Computing Systems Workshops, 2008. ICDCS '08. 28th International Conference, Publication Year: 2008, pp. 222-227.
Losee, Robert M. Jr., "Minimizing information overload: the ranking of electronic messages", Journal of Information Science 15, Elsevier Science Publishers B.V., 1989, pp. 179-189.
Miyashita, K. et al., "A Map Matching Algorithm for Car Navigation Systems that Predict User Destination", Advanced Information Networking and Applications—Workshops, 2008. AINAW 2008. 22nd International Conference, Publication Year: 2008, pp. 1551-1556.
Rhodes, Bradley J., "The Wearable Remembrance Agent: A System for Augmented Memory", Personal Technologies Journal Special Issue on Wearable Computing, 1997, 12 pages.
Rhodes, Bradley J., "The Wearable Remembrance Agent: A System for Augmented Theory", The Proceedings of the First International Symposium on Wearable Computers, Oct. 1997, pp. 123-128.
Sananmongkhonchai, S. et al., "Cell-based traffic estimation from multiple GPS-equipped cars", 2009 IEEE Region 10 Conference Publication Year: 2009, pp. 1-6.
Schilit, Bill, et al., "Context-Aware Computing Applications", In Proceedings of the Workshop on Mobile Computing Systems and Applications, Dec. 1994, pp. 85-90.
Schilit, Bill, et al., "Customizing Mobile Applications", Proceedings USENIX Symposium on Mobile and Location Independent Computing, Aug. 1993, 9 pages.
Schilit, Bill, et al., "Disseminating Active Map Information to Mobile Hosts", IEEE Network, 1994 pp. 22-32, vol. 8—No. 5.
Schilit, Bill, et al., "The ParcTab Mobile Computing System", IEEE WWOS-IV, 1993, 4 pages.
Schilit, William Noah, "A System Architecture for Context-Aware Mobile Computing", Columbia University, 1995, 153 pages.
Simmons, R, et al, "Learning to Predict Driver Route and Destination Intent", Intelligent Transportation Systems Conference, 2006. IEEE; Digital Object Identifier: 10.1109/ITSC.2006.1706730 Publication Year: 2006, pp. 127-132.
Spreitzer, Mike, et al., "Providing Location Information in a Ubiquitous Computing Environment", SIGOPS '93, 1993, pp. 270-283.
Spreitzer, Mike, et al., "Architectural Considerations for Scalable, Secure, Mobile Computing with Location Information", In the 14th International Conference on Distributed Computing Systems, Jun. 1994, pp. 29-38.
Spreitzer, Mike, et al., "Scalable, Secure, Mobile Computing with Location Information", Communications of the ACM, Jul. 1993, 1 page, vol. 36—No. 7.
Starner, Thad Eugene, "Wearable Computing and Contextual Awareness", Massachusetts Institue of Technology, Jun. 1999, 248 pages.
Terada, T, et al., "Design of a Car Navigation System that Predicts User Destination", Mobile Data Management, 2006. MDM 2006. 7th International Conference on; Publication Year: 2006, pp. 145-150.
Theimer, Marvin, et al., "Operating System Issues for PDA's", in Fourth Workshop on Workstation Operating Systems, 1993, 7 pages.
Vaughan-Nichols, S.J., "Will Mobile Computing's Future Be Location, Location, Location?", Computer; vol. 42, Issue: 2 Digital Object Identifier: 10.1109/MC.2009.65; Publication Year: 2009, pp. 14-17.
Want, Roy, "Active Badges and Personal Interactive Computing Objects", IEEE Transactions on Consumer Electronics, 1992, 11 pages, vol. 38—No. 1.
Want, Roy, et al., "The Active Badge Location System", ACM Transactions on Information Systems, Jan. 1992, pp. 91-102, vol. 10—No. 1.
Wei, Chien-Hung, et al., "Development of Freeway Travel Time Forecasting Models by Integrating Different Sources of Traffic Data", IEEE Transactions on Vehicular Technology; vol. 56, Issue: 6, Part: 2; Nov. 2007, pp. 3682-3694.
Weiser, Mark, "Some Computer Science Issues in Ubiquitous Computing", Communications of the ACM, Jul. 1993, pp. 75-84, vol. 36—No. 7.
Weiser, Mark, "The Computer for the 21st Century", Scientific American, Sep. 1991, 8 pages.
Workshop on Wearable Computing Systems, Aug. 19-21, 1996.

(56) References Cited

OTHER PUBLICATIONS

Wu, Yan-Jing, et al., "A dynamic navigation scheme for vehicular ad hoc networks", Networked Computing and Advanced Information Management (NCM), 2010 Sixth International Conference on; Publication Year: 2010, pp. 231-235.
Xie, M. et al., "Development of Navigation System for Autonomous Vehicle to Meet the DARPA Urban Grand Challenge", Intelligent Transportation Systems Conference, 2007. ITSC 2007. IEEE; Sep. 30-Oct. 3, 2007, Seattle, WA; pp. 767-772.
Ye, Qian, et al, "Predict Personal Continuous Route", 2008. 11$^{th}$ International IEEE Conference on Intelligent Transportation Systems; Oct. 12-15, 2008, Beijing, China; pp. 587-592.
PCT Application Serial No. PCT/US2008/067808, International Search Report and Written Opinion dated Dec. 12, 2008; 8 pages.
PCT Application Serial No. PCT/US2006/034608, International Search Report dated Jan. 15, 2007; 2 pages.
PCT Application Serial No. PCT/US00/20685; International Search Report dated Sep. 29, 2003; 3 pages.
Russian Patent Appln. 2008112196/11; Office Action dated Jun. 8, 2010.
Rhodes, "Remembrance Agent: A Continuously Running Automated Information Retrieval System", Proceedings of the First International Conference on the Practical Application of Intelligent Agents and Multi Talent Technology, Apr. 22-24, 1996.
Biegel et al., "A Framework for Developing Mobile, Context-Aware Applications", Proceedings of the Second IEEE Annual Conference on Pervasive Computing and Communications, pp. 361-365, Mar. 14-17, 2004.
Bisdikian et al., "Intelligent Pervasive Middleware for Context-Based and Localized Telematics Services", Proceedings of the Second International ACM Conference on Mobile Commerce, pp. 15-24, Sep. 2002.
Kargl et al., "Smart Reminder—Personal Assistance in a Mobile Computing Environment", Proceedings of the International Conference on Pervasive Computing, Aug. 26-28, 2002.
"Non-Final Office Action", Dated Aug. 15, 2014, From U.S. Appl. No. 13/284,128, filed Oct. 28, 2011.
"Non-Final Office Action", Dated Mar. 1, 2013, From U.S. Appl. No. 12/954,545, filed Nov. 24, 2010.
"Non-Final Office Action", Dated Jun. 15, 2012, From U.S. Appl. No. 12/954,545, filed Nov. 24, 2010.
Response to the Jun. 15, 2012 Non-Final Office Action, From U.S. Appl. No. 12/954,545, filed Sep. 24, 2012.
Response to the Mar. 1, 2013 Non-Final Office Action, From U.S. Appl. No. 12/954,545, filed Jun. 24, 2013.
"Non-Final Office Action", Dated May 28, 2014, From U.S. Appl. No. 13/183,124, filed Jul. 14, 2011.
"Non-Final Office Action", Dated Jun. 11, 2014, From U.S. Appl. No. 13/183,050, filed Jul. 14, 2011.
"Non-Final Office Action", Dated Mar. 26, 2009, From U.S. Appl. No. 11/733,701, filed Apr. 10, 2007.
Response to the Mar. 26, 2009 Non-Final Office Action, From U.S. Appl. No. 11/733,701, filed Jun. 26, 2009.
"Final Office Action", Dated Oct. 21, 2009, From U.S. Appl. No. 11/733,701, filed Apr. 10, 2007.
Response to the Oct. 21, 2009 Final Office Action, From U.S. Appl. No. 11/733,701, filed Dec. 2, 2009.
"Non-Final Office Action", Dated Dec. 23, 2011, From U.S. Appl. No. 11/733,701, filed Apr. 10, 2007.
Response to the Dec. 23, 2011 Non-Final Office Action, From U.S. Appl. No. 11/733,701, filed Mar. 27, 2012.
"Non-Final Office Action", Dated Sep. 3, 2009, From U.S. Appl. No. 11/426,540, filed Jun. 26, 2006.
Response to the Jun. 26, 2009 Non-Final Office Action, From U.S. Appl. No. 11/426,540, filed Nov. 24, 2009.
"Non-Final Office Action", Dated Oct. 14, 2010, From U.S. Appl. No. 11/426,540, filed Jun. 26, 2006.
Response to the Oct. 14, 2010 Non-Final Office Action, From U.S. Appl. No. 11/426,540, filed Jan. 25, 2011.
"Non-Final Office Action", Dated Apr. 6, 2010, From U.S. Appl. No. 11/426,540, filed Jun. 26, 2006.
Response to the Apr. 6, 2010 Non-Final Office Action, From U.S. Appl. No. 11/426,540, filed Jul. 6, 2010.
"Amendment After Allowance Under 37 C.F.R. 1.312" From U.S. Appl. No. 11/426,540, filed Jun. 14, 2011.
Office Communication in Response to Amendment After Allowance Under 37 C.F.R. 1.312 From U.S. Appl. No. 11/426,540, filed Jun. 29, 2011.
Japanese Office Action from Application No. 2008-533377 Dated: May 31, 2011, Filed: Sep. 5, 2006.
Chinese Office Action Dated: Jul. 23, 2009 from Application No. 200680036290.9, Filed: Sep. 5, 2006.
Response to the Mar. 20, 2009 Chinese Office Action from Application No. 200680036290.9, Dated: Jul. 22, 2009.
Chinese Office Action Dated: Mar. 20, 2009 from Application No. 200680036290.9, Filed: Sep. 5, 2006.
Response to Jul. 31, 2012 Malaysian Office Action from Application No. PI 20080636, Filed Sep. 26, 2012.
Response to the Oct. 12, 2009 New Zealand Examination Report from Application No. 566701, Filed Apr. 29, 2010.
"Examination Report", Dated: Oct. 12, 2009 from New Zealand Application No. 566701. Filed Sep. 5, 2006.
Response to the May 18, 2010 New Zealand Examination Report from Application No. 566701, Filed May 24, 2010.
"Examination Report", Dated: May 18, 2010 from New Zealand Application No. 566701. Filed Sep. 5, 2006.
Philippine Office Action Dated: Sep. 9, 2011 from Philippine Application No. 1-2008-500513 Filed: Sep. 5, 2006.
Russian Office Action Dated: Mar. 30, 2010 from Russian Application No. 2008112196, Filed Sep. 5, 2006.
"Response to the May 28, 2014 Non-Final Office Action" From U.S. Appl. No. 13/183,124, filed Sep. 29, 2014.
"Response to the Jun. 11, 2014 Non-Final Office Action" From U.S. Appl. No. 13/183,050, filed Oct. 10, 2014.
Ghasemzadeh, H. et al., "Action Coverage Formulation for Power Organization in Body Sensor Networks," in Proceedings of the 2008 Asia and South Pacific Design Automation Conference, Jan. 2008, IEEE Computer Society Press, pp. 446-451.
Final Office Action Mailed Nov. 26, 2014 from U.S. Appl. No. 13/183,050, 22 ages.
Response to Non-Final Office Action Filed Nov. 17, 2014 from U.S. Appl. No. 13/284,128, 15 pages.
Non-Final Office Action Mailed Feb. 3, 2015, From U.S. Appl. No. 13/183,124, 29 Pages.
Response to Final Office Action Filed Feb. 25, 2015, From U.S. Appl. No. 13/183,050, 17 Pages.
"MEMS based motion sensing design", Retrieved at <<http://www.eeherald.com/selection/design-guide/mems_application.html>>, Retrieved Mar. 30, 2011, 2 Pages.
Ashbrook et al., "Using GPS to Learn Significant Locations and Predict Movement Across Multiple Users", Personal and Ubiquitous Computing, 7(5), 2003, pp. 275-286, 15 pages.
Chen et al., "HarpiaGrid: A Reliable Grid-based Rounding Protocol for Vehicular Ad Hoc Networks", Intelligent Transportation Systems, ITSC 2008, 11th International IEEE Conference, pp. 383-388, 6 pages.
Coyne et al., "Comparison of Differentially Corrected GPS Sources for Support of Site-Specific Management in Agriculture", Jul. 2003, Kansas State University Agricultural Experiment Station and Cooperative Extension Service, 35 pages.
Hu et al., "Simulation-Assignment-Based Travel Time Prediction Model for Traffic Corridors," Intelligent Transportation Systems, IEEE Transactions, vol. PP, Issue 99, 2012, pp. 1277-1286, 10 pages.
Hu et al., "Summary of Travel Trends", 2001 National Household Survey, Dec. 2004, U.S. Department of Transportation, U.S. Federal Highway Administration, 135 pages.
Kanoh et al., "Evaluation of GA-based Dynamic Rout Guidance for Car Navigation using Cellular Automata," Intelligent Vehicle Symposium, 2002, IEEE, vol. 1, pp. 178-183, 6 pages.

(56) References Cited

OTHER PUBLICATIONS

Kanoh et al., "Route Guidance with Unspecific Staging Post using Genetic Algorithm for Car Navigation Systems," Intelligent Transport Systems, 2000, IEEE, pp. 119-124, 6 pages.
Kanoh et al., "Knowledge Based Genetic Algorithm for Dynamic Route Selection," Knowledge-Based Intelligent Engineering Systems and Allied Technologies, 2000, Proceedings Fourth International Conference on vol. 2, pp. 616-619, 4 pages.
Krumm et al., "The Microsoft Multiperson Location Survey", (MSR-TR-2005-103), Aug. 2005, Microsoft Research, 4 pages.
Lai et al., "Hierarchical Incremental Pat Planning and Situation-Dependent Optimized Dynamic Motion Planning Considering Accelerations," Systems, Man, and Cybernetics, Part B: Cybernetics, IEEE Transactions on vol. 37, Issue 6, 2007, pp. 1541-1554, 14 pages.
Marmasse et al., "A User-Centered Location Model", Personal and Ubiquitos Computing, 2002(6), pp. 318-321, 4 pages.
Patterson et al., "Opportunity Knocks: A System to Provide Dobnitive Assistance with Transportation Services", in UbiComp 2004: Ubiquitous Computing, 2004, Nottingham, UK; Springer, 18 pages.
Rish, "An Empirical Study of the Naïve Bayes Classifier", IJCAI-01 Workshop on Empirical Methods in AI, Nov. 2, 2001, 7 pages.
Vanajakshi et al., "Support Vector Machine Technique for the Short Term Prediction of Travel Time," Intelligent Vehicles Symposium, 2007 IEEE, pp. 600-605, 6 pages.
Cheng, et al., "Location Prediction Algorithms for Mobile Wireless Systems," Wireless Internet Handbook: Technologies, Standards, and Applications, 2003, CRC Press, Boca Raton, FL, pp. 245-263, 17 pages.
Hariharan, et al., "Project Lachesis: Parsing and Modeling Location Histories," Geographic Information Science: Third International Conference, GI Science 2004, Adelphi, MD, Springer-Verlag GmbH, 19 pages.
Liao, et al., "Learning and Inferring Transportation Route ins," Proceedings of the 19th National Conference on Artificial Intelligence (AAAI), 2004, San Jose, CA, 6 pages.
Gogate, et al., "Modeling Transportation Routines using Hybrid Dynamic Mixed Networks," Uncertainty in Artificial Intelligence (UAI), 2005, 8 pages.
Angermann, et al., "Software Represenation for Heterogeneous Location Data Sources Using Probability Density Functions," International Symposium on Location Based Services for Cellular Users (LOCELLUS), 2001, Munich, Germany, 10 pages.
Elfes et al., "Using Occupancy Grids for Mobile Robot Perception and Navigation," IEEE Computer, 1989, 22(6), pp. 46-57, 12 pages.
Krumm, "Predestination: Predicting Driving Destinations from Map Data," UbiComp 2006: Ubiquitous Computing 8th International Conference, 18 pages.
Krumm, John, "Real Time Destination Prediction Based on Efficient Routes," SAE Technical Paper, Paper No. 2006-01-0811, Apr. 3, 2006, 6 pages.
Karbassi et al., "Vehicle Route Prediction and Time of Arrival Estimation Techniques for Improved Transportation System Management," Proceedings of the Intelligent Vehicles Symposium, 2003, pp. 511-516, 6 pages.
Notice of Allowance mailed Apr. 15, 2011 from U.S. Appl. No. 11/426,540, 10 pages.
Second Office Action mailed Sep. 4, 2009 from Chinese Patent Application No. 200680036290.9, 7 pages.
Supplemental Amendment filed Feb. 13, 2013 from U.S. Appl. No. 12/954,545, 11 pages.
Notice of Allowance mailed Jul. 11, 2013 from U.S. Appl. No. 12/954,545, 10 pages.
Applicant Initiated Interview Summary mailed Aug. 26, 2013 from U.S. Appl. No. 12/954,545, 3 pages.
Response filed May 4, 2015 to the Non-Final Office Action dated Feb. 3, 2015 from U.S. Appl. No. 13/183,124, 16 pages.
Non-Final Rejection mailed Jun. 18, 2015 from U.S. Appl. No. 13/184,050, 24 pages.
Official Action mailed Mar. 25, 2014 Withdrawing/Vacating previous Office Action from U.S. Appl. No. 13/184,050, 2 pages.
Applicant Initiated Interview Summary mailed Dec. 26, 2013 from U.S. Appl. No. 13/184,050, 3 pages.
Non-Final Office Action mailed Sep. 24, 2013 from U.S. Appl. No. 13/184,050, 11 pages.
Notice of Allowance and Examiner Initiated Interview Summary mailed Jul. 22, 2015 from U.S. Appl. No. 13/183,124, 17 pages.
Supplemental Notice of Allowability mailed Aug. 4, 2015 from from U.S. Appl. No. 13/183,124, 2 pages.
Response to Second Office Action filed Nov. 4, 2009 from Chinese Patent Application No. 200680036290.9, 12 pages.
Notice of Allowance mailed Jan. 22, 2010 from Chinese Patent Application No. 200680036290.9, 4 pages.
Extended European Search Report mailed Jun. 14, 2012 from European Patent Application No. 06802991.7, 6 pages.
Notice of Rejection and translation mailed May 31, 2011 from Japanese Patent Application No. 2008-533377, 6 pages.
Response filed Aug. 25, 2011 from Japanese Patent Application No. 2008-533377, 2 pages.
Notice of Allowance mailed Dec. 16, 2011 from Japanese Patent Application No. 2008-533377, 6 pages.
Request for Examination and Amendment filed Aug. 26, 2011 from Korean Patent Application No. 10-2008-7007693, 22 pages.
Notice of Allowance mailed Aug. 30, 2013 from Malaysian Patent Application No. PI 20080636, 3 pages.
Notice of Acceptance mailed Jun. 11, 2010 from New Zealand Patent Application No. 566701, 1 page.
Response filed May 13, 2010 from Russian Patent Application No. 20081121996, 8 pages.
Amendment filed Apr. 9, 2009 from South African Patent Application No. 2008102681, 3 pages.
Notice of Panel Decision from Pre-Appeal Brief Review mailed May 19, 2015 from U.S. Appl. No. 13/190,121, 2 pages.
Pre-Appeal Brief Request and Notice of Appeal filed Apr. 28, 2015 from U.S. Appl. No. 13/190,121, 8 pages.
Final Office Action mailed Jan. 28, 2015 from U.S. Appl. No. 13/190,121, 12 pages.
Response/Amendment and Reply filed Sep. 30, 2014 from U.S. Appl. No. 13/190,121, 15 pages.
Non-Final Office Action mailed Jul. 1, 2014 from U.S. Appl. No. 13/190,121, 11 pages.
Response/Amendment and Reply filed Apr. 15, 2014 from U.S. Appl. No. 13/190,121, 14 pages.
Non-Final Office Action mailed Jan. 15, 2014 from U.S. Appl. No. 13/190,121, 9 pages.
Response/Amendment and Reply filed Sep. 25, 2013 from U.S. Appl. No. 13/190,121, 11 pages.
Non-Final Office Action mailed Jun. 27, 2013 from U.S. Appl. No. 13/190,121, 10 pages.
Response/Amendment and Reply filed Mar. 11, 2013 from U.S. Appl. No. 13/190,121, 11 pages.
Non-Final Office Action mailed Dec. 12, 2012 from U.S. Appl. No. 13/190,121, 8 pages.
Notice of Allowance mailed Sep. 4, 2012 from U.S. Appl. No. 13/190,121, 8 pages.
Response/Amendment and Reply filed Apr. 19, 2012 from U.S. Appl. No. 13/190,121, 9 pages.
Non-Final Office Action mailed Jan. 19, 2012 from U.S. Appl. No. 13/190,121, 8 pages.
Restriction Requirement mailed Feb. 26, 2009 from U.S. Appl. No. 11/733,701, 9 pages.
Response to Restriction Requirement filed Mar. 5, 2009 from U.S. Appl. No. 11/733,701, 2 pages.
Applicant Summary of Interview with Examiner filed Oct. 5, 2012 from U.S. Appl. No. 12/954,545, 2 pages.
Applicant Initiated Interview Summary mailed Oct. 16, 2012 from U.S. Appl. No. 12/954,545, 3 pages.
Notice of Allowance mailed Nov. 26, 2012 from U.S. Appl. No. 12/954,545, 9 pages.
Goldstone et al., "Group Path Formation," IEEE Transaction on Systems, Man and Cybernetics, Part A: Systems and Humans, 2006, vol. 36, Issue 3, pp. 611-620, 10 pages.

(56) References Cited

OTHER PUBLICATIONS

Samaan et al., "A User Centric Mobility Prediction Approach Based on Spatial Conceptual Maps," 2005 IEEE International Conference on Communications, vol. 2, pp. 1413-1417, 5 pages.
Thiagarajan et al., "Cooperative Transit Tracking Using Smart-Phones," SenSy'10, Zurich, Switzerland, Nov. 3-5, 2010, pp. 85-98, 14 pages.
Request for Examination and Voluntary Amendment filed Sep. 2, 2011 in the Canadian Patent Application No. 2,620,587, 51 pages.
Non-Final Office Action mailed Sep. 8, 2015 from U.S. Appl. No. 13/190,121, 12 pages.
Supplemental Notice of Allowability mailed Aug. 27, 2015 from from U.S. Appl. No. 13/183,124, 2 pages.
Response filed Feb. 25, 2015 to Final Office Action mailed Nov. 26, 2014 from U.S. Appl. No. 13/183,050, 17 pages.
Non-Final Office Action mailed Jun. 18, 2015 from U.S. Appl. No. 13/183,050, 24 pages.
Non-Final Office Action mailed Sep. 17, 2015 from U.S. Appl. No. 13/284,128, 22 pages.
Notice of Allowance, Office Action Appendix and Applicant-Initiated Interview Summary mailed Oct. 20, 2015 from U.S. Appl. No. 13/183,050, 20 pages.
Amin et al., "Fancy a Drink in Canary Wharf? A User Study on Location-Based Mobile Search," In Proceedings of the 12th IFIP TC 13 International Conference on Human-Computer Interaction: Part I, Aug. 24, 2009, 14 pages.
Dissanayake et al., "A Solution to the Simultaneous Localization and Map Building (SLAM) Problem," retrieved at <<http://ieeexplore.ieee.org/stamp/stamp.jsp?tp=8,amumber=938381>>, Proceedings: IEEE Transactions on Robotics and Automation, vol. 17, No. 3, Jun. 2001, pp. 229-241, 13 pages.
Jeong et al., "TBD: Trajectory-Based Data Forwarding for Light-Traffic Vehicular Networks," 29th IEEE International conference on Distributed Computing Systems, Jun. 22-26, 2009, pp. 231-238, 8 pages.
Liu et al., "Location Awareness through Trajectory Prediction," Computers, Environment and Urban Systems, Elsevier, retrieved at http://www.sis.pitt.edu/~xliu/papers/ceus.pdf, 2006, 38 pages.
Renso et al., "Wireless Network Data Sources: Tracking and Synthesizing Trajectories," retrieved at <<http://www.dsc.ufcg.edu.br/~sampaio/Livros/mobility-data-mining-and-privacy-geographic-knowledge-discover.pdf#page=84>>, 2008, pp. 73-99, 28 pages.
Subramanian et al., "Drive-by Localization of Roadside WiFi Networks," IEEE Infocom Conference, Apr. 13-18, 2008, pp. 718-725, 9 pages.
Wei et al., "PATS: A Framework of Pattern-Aware Trajectory Search," in IEEE Eleventh International Conference on Mobile Data Management (MDM), May 23, 2010, pp. 372-377, 6 pages.
Notice of Allowance mailed Nov. 16, 2015 from U.S. Appl. No. 13/183,124, 8 pages.
Preliminary Amendment filed Aug. 23, 2013 from U.S. Appl. No. 13/606,029, 8 pages.
Restriction Requirement mailed Jun. 25, 2015 from U.S. Appl. No. 13/606,029, 6 pages.
Response filed Jul. 21, 2015 to Restriction Requirement mailed Jun. 25, 2015 from U.S. Appl. No. 13/606,029, 8 pages.
Non-Final Office Action mailed Aug. 7, 2015 from U.S. Appl. No. 13/606,029, 16 pages.
Applicant Initiated Interview Summary mailed Nov. 17, 2015 from US. Appl. No. 13/606,029, 3 pages.
Response filed Nov. 17, 2015 to Non-Final Office Action mailed Aug. 7, 2015 from U.S. Appl. No. 13/606,029, 14 pages.
Final Office Action mailed Dec. 4, 2015 from U.S. Appl. No. 13/606,029, 6 pages.
International Search Report and Written Opinion mailed Dec. 20, 2013 from PCT Patent Application No. PCT/US2013/058350, 9 pages.
Restriction Requirement mailed Mar. 21, 2014 from U.S. Appl. No. 13/551,613, 8 pages.

Response filed Apr. 28, 2014 to Restriction Requirement mailed Mar. 21, 2014 from U.S Appl. No. 13/551,613, 13 pages.
Non-Final Office Action mailed Aug. 13, 2014 from U.S. Appl. No. 13/551,613, 10 pages.
Response filed Nov. 13, 2014 to Non-Final Office Action mailed Aug. 13, 2014 from U.S. Appl. No. 13/551,613, 17 pages.
Final Office Action mailed Mar. 11, 2015 from U.S. Appl. No. 13/551,613, 15 pages.
Response filed Jun. 16, 2015 to Final Office Action mailed Mar. 11, 2015 from U.S. Appl. No. 13/551,613, 16 pages.
Non-Final Office Action mailed Jul. 10, 2015 from U.S. Appl. No. 13/551,613, 11 pages.
International Search Report and Written Opinion mailed Nov. 8, 2013 from PCT Patent Application No. PCT/US2013/050963, 13 pages.
Communication Pursuant to Rules 161(1) and 162 EPC mailed Feb. 26, 2015 from European Patent Application No. 13748129.7, 2 pages.
Response filed Jul. 31, 2015 to the Communication mailed Feb. 26, 2015 from European Patent Application No. 137481298.7, 9 pages.
Response mailed Dec. 12, 2015 to the Non-Final Office Action mailed Jul. 16, 2015 from U.S. Appl. No. 13/551,613, 13 pages.
Response filed Dec. 8, 2015 to the Non-Final Office Action mailed Sep. 8, 2015 from U.S. Appl. No. 13/190,121, 15 pages.
Response filed Jan. 15, 2016 to Non-Final Office Action mailed Sep. 17, 2015 from U.S. Appl. No. 13/284,128, 16 pages.
Notification of the First Office Action mailed Dec. 31, 2015 from China Patent Application No. 201380038072.9 14 pages.
Non-Final Office Action mailed Jun. 28, 2011 from U.S. Appl. No. 12/417,752, 15 pages.
Response filed Oct. 27, 2011 to Non-Final Office Action mailed Jun. 28, 2011 from U.S. Appl. No. 12/417,752, 17 pages.
Final Office Action mailed Sep. 13, 2012 from U.S. Appl. No. 12/417,752, 18 pages.
Response filed Dec. 13, 2012 to Final Office Action mailed Sep. 13, 2012 from U.S. Appl. No. 12/417,752, 13 pages.
Non-Final Office Action mailed May 24, 2013 from U.S. Appl. No. 12/417,752, 18 pages.
Response filed Jul. 2, 2013 to Non-Final Office Action mailed May 24, 2013 from U.S. Appl. No. 12/417,752, 16 pages.
Final Office Action mailed Jul. 17, 2013 from U.S. Appl. No. 12/417,752, 18 pages.
Response filed Sep. 30, 2013 to Final Office Action mailed Jul. 17, 2013 from U.S. Appl. No. 12/417,752, 18 pages.
Non-Final Office Action mailed Oct. 29, 2013 from U.S. Appl. No. 12/417,752, 17 pages.
Response filed Dec. 23, 2013 to Non-Final Office Action mailed Oct. 29, 2013 from U.S. Appl. No. 12/417,752, 21 pages.
Final Office Action and Applicant Initiated Interview Summary mailed Feb. 25, 2014 from U.S. Appl. No. 12/417,752, 26 pages.
Notice on the First Office Action and Search Report mailed Mar. 3, 2016 from China Patent Application No. 201380046819.5, 13 pages.
"Ignite Where & Launch Pad", retrieved on Feb. 5, 2009 at <<http://en.oreilly.com/where2008/public/schedule/detail/2572>>, O'Reilly, Where 2.0 Conference 2008, May 2008, 4 pages.
Aalto et al., "Bluetooth and WAP Push Based Location-Aware Mobile Advertising System", retrieved on Feb. 5, 2009 at <<http://www.mediateam.oulu.fi/publications/pdf/496.pdf, ACM, MobiSYS '04, Jun. 6-9, 2004, Boston MA, 10 pages.
Azizyan et al., "SurroundSense: Mobile Phone Localization Using Ambient Sound and Light", retrieved on Feb. 5, 2009 at <<http://synrg.ee.duke.edu/papers/surroundsense-poster.pdf>>, Sep. 22, 2008, 1 page.
Bahl et al., "Radar: An In-Building RF-based User Location and Tracking System", retrieved on Feb. 5, 2009 at <<https://research.microsoft.com/en-us/um/people/padmanab/papers/infocom2000.pdf>>, Microsoft Research, Proceedings of IEEE Infocom 2000, Tel-Aviv, Israel, Mar. 2000, 10 pages.

(56) References Cited

OTHER PUBLICATIONS

Balakrishnan et al., "ITR: Scalable Location-Aware Monitoring (SLAM) Systems", retrieved on Feb. 5, 2009 at <<http://nms.lcs.mit.edu/projects/slam/prop.pdf>>, Laboratory for Computer Science & Department of EECS, MIT, Cambridge, MA, Nov. 9, 2001, 31 pages.
Constandache et al., "Energy-Aware Localization Using Mobile Phones", retrieved on Feb. 5, 2009 at <<http://www.cs.duke.edu/~ionut/2008_mobisys.pdf>>, Poster, ACM MobiSys, Jun. 2008, 1 page.
Flinn, Jason, "Extending Mobile Computer Battery Life through Energy-Aware Adaptation", retrieved on Feb. 5, 2009 at <<http://reports-archive.adm.cs.cmu.edu/anon/2001/CMU-CS-01-171.pdf>>, School of Computer Science, Carnegie Mellon University, Pittsburgh, PA, Dec. 2001, 165 pages.
Gaonkar et al., "Micro-Blog: Sharing and Querying Content Through Mobile Phones and Social Participation", ACM, MobiSys 2008, Jun. 17-20, 2008, Breckenridge, CO, 13 pages.
Kansal et al., "Location and Mobility in a Sensor Network of Mobile Phones", retrieved on Feb. 5, 2009 at <<http://research.microsoft.com/apps/pubs/default.aspx?id=70416>>, Microsoft Research, Microsoft Corporation, Jun. 4, 2007, 1 page.
Krumm et al., "Predestination: Inferring Destinations from Partial Trajectories", retrieved on Feb. 5, 2009 at <<http://research.microsoft.com/en-us/um/people/horvitz/predestination.pdf>>, UbiComp 2006: The Eighth International conference on Ubiquitous Computing, Sep. 17-21, 2006, Orange County, CA, 18 pages.
Krumm et al., "RightSPOT: A Novel Sense of Location for a Smart Personal Object", retrieved on Feb. 5, 2009 at <<http://research.microsoft.com/en-us/um/people/horvitz/rightspot.htm>>, Proceedings of Ubicomp 2003, vol. 2864, pp. 36-43, 3 pages.
Lamarca et al., "Place Lab: Device Positioning Using Radio Beacons in the Wild", retrieved on Feb. 5, 2009 at <<http://www.placelab.org/publications/pubs/pervasive-placelab-2005-final.pdf>>, In Proceedings of Pervasive 2005, Munich, Germany, 18 pages.
Liao et al., "Extracting Places and Activities from GPS Traces Using Hierarchical Conditional Random Fields", The International Journal of Robotics Research, vol. 26, No. 1, pp. 119-134, 2007, 17 pages.
Lin et al., "Enabling Energy-Efficient and Quality Localization Services", retrieved on Feb. 5, 2009 at <<http://nslab.ee.ntu.edu.tw/publication/conf/qols-percom06.pdf>>, National Taiwan University, 2006, 4 pages.
Peng et al., "BeepBeep: A High Accuracy Acoustic Ranging System using COTS Mobile Devices", ACM, SenSys 2007, Nov. 6-9, 2007, Sydney, Australia, 14 pages.
Person, Jon, "Writing Your Own GPS Applications: Part 2", retrieved on Feb. 5, 2009 from <<http://www.codeproject.com/KB/mobile/WritingGPSApplications2.aspx>>, The Code Project, Dec. 20, 2004, 15 pages.
Ruairi et al., "An Energy-Efficient, Multi-Agent Sensor Network for Detecting Diffuse Events", retrieved on Feb. 5, 2009 at <<http://www.aaai.org/Papers/IJCAI/2007/IJCA107-224.pdf>>, IJCAI-07, 2007, pp. 1390-1395, 6 pages.
Schindler et al., "City-Scale Location Recognition", retrieved on Feb. 5, 2009 at <<http://www.cc.gatech.edu/~phlosoft/files/schindler07cvpr2.pdf>>, IEEE Computer Society Conference on Computer Vision and Pattern Recognition (CVPR), 2007, 7 pages.
Kansal, Aman and Feng Zhao, "Location and Mobility in a Sensor Network of Mobile Phones," ACM SIGMM 17th International Workshop on Network and Operating Systems Support for Digital Audio & Video (NOSSDAV), Association for Computing Machinery, Inc., Urbana, IL, 2007, 6 pages.
Notice of Allowance mailed Feb. 29, 2016 from U.S. Appl. No. 13/183,124, 24 pages.
Final Office Action mailed Mar. 4, 2016 from U.S. Appl. No. 13/190,121, 14 pages.
Office Action and Examiner Initiated Interview Summary mailed Mar. 9, 2016 from U.S. Appl. No. 13/551,613, 5 pages.
Notice of Allowance mailed Mar. 14, 2016 from U.S. Appl. No. 13/183,050, 49 pages.
Response and After Final Request Pilot Program 2.0 filed Feb. 11, 2016 to Final Office Action mailed Dec. 4 2015 from U.S. Appl. No. 13/606,029, 11 pages.
Advisory Action and After Final Consideration Pilot Program Decision mailed Feb. 23, 2016 from U.S. Appl. No. 13/606,029, 4 pages.
Non-Final Office Action mailed Apr. 4, 2016 from U.S. Appl. No. 13/606,029, 15 pages.
Final Office Action mailed May 12, 2016 from U.S. Appl. No. 13/284,128, 58 pages.
Response to Ex Parte Quayle Action filed May 9, 2016 from U.S. Appl. No. 13/551,613, 5 pages.
Smailagic et al., "Location Sensing and Privacy in a Context-Aware Computing Environment", IEEE Wireless communications, Oct. 2002, pp. 10-17, 8 pages.
Sun et al., "Signal Processing Techniques in Network-Aided Positioning—A survery of state-of-the-art positioning lesigns", IEEE Signal Processing Magazine, Jul. 2005, 12 pages.
Youssef et al., "The Horus WLAN Location Determination System", retrieved on Feb. 5, 2009 at <<http://www.cs.umd.edu/~moustafa/papers/horus_usenix.pdf>>, Department of Computer Science, University of Maryland, 2005, 14 pages.
Zhang et al., "The Two Facets of the Exploration-Exploitation Dilemma", Proceedings of the IEEE/WIC/ACM International Conference on Intelligent Agent Technology (IAT '06), 2006, 7 pages.
Notice of Appeal and Pre-Brief Conference Request mailed Apr. 19, 2016 from U.S. Appl. No. 13/190,121, 10 pages.
Notice of Allowability mailed Jun. 14, 2016 from U.S. Appl. No. 13/183,124, 10 pages.
Notice of Allowability mailed Jun. 10, 2016 from U.S. Appl. No. 13/183,050, 19 pages.
Preliminary Amendment filed Jun. 15, 2016 to U.S. Appl. No. 15/181,091, 8 pages.
Notice of Allowance mailed Jun. 6, 2016 from U.S. Appl. No. 13/551,613, 7 pages.
Notice of Panel Decision from Pre-Appeal Brief Review mailed Jun. 8, 2016 from U.S Appl. No. 13/190,121, 2 pages.
Response filed May 16, 2016 to the Office Action mailed Dec. 31, 2015 from China Patent Application No. 201380038072.9, 6 pages.
Request for Examination and Voluntary Amendment filed Jun. 15, 2016 from Japanese Patent Application No. 2015-523237, 8 pages.
Response filed Jul. 18, 2016 to the Office Action mailed Mar. 3, 2016 from China Patent Application No. 201380046819.5, 10 pages.
Response filed Jul. 19, 2016 to the Office Action mailed Apr. 4, 2016 from U.S. Appl. No. 13/606,029, 17 pages.

\* cited by examiner

TECHNIQUES $T_1, T_0$
900

```
┌─────────────────────────────────────────────┐
│  RECEIVE A GNSS-DERIVED POSITION FROM THE GNSS │
│                   MODULE                     │
│                    902                       │
└─────────────────────────────────────────────┘
                     │
                     ▼
┌─────────────────────────────────────────────┐
│  USE THE GNSS-DERIVED POSITION AS THE CURRENT │
│         POSITION OF THE USER DEVICE          │
│                    904                       │
└─────────────────────────────────────────────┘
                     │
                     ▼
```

REPEAT AT A FREQUENCY BASED ON DISTANCE FROM VENUE

FIG. 9

DETERMINING A POSITION BY DETECTING A SHORT-RANGE BEACON
1000

```
┌─────────────────────────────────────────────┐
│  RECEIVE A WIRELESS SIGNAL TRANSMITTED BY A SHORT- │
│               RANGE BEACON                   │
│                    1002                      │
└─────────────────────────────────────────────┘
                     │
                     ▼
┌─────────────────────────────────────────────┐
│  IDENTIFY THE SHORT-RANGE BEACON ASSOCIATED WITH │
│  THE WIRELESS SIGNAL, AND ITS ASSOCIATED POSITION │
│                    1004                      │
└─────────────────────────────────────────────┘
                     │
                     ▼
┌─────────────────────────────────────────────┐
│  USE THE POSITION OF THE SHORT-RANGE BEACON AS THE │
│       CURRENT POSITION OF THE USER DEVICE    │
│                    1006                      │
└─────────────────────────────────────────────┘
```

FIG. 10

POWER EFFICIENT ACTIVATION OF A DEVICE MOVEMENT SENSOR MODULE

BACKGROUND

A portable user device may rely on a global navigation satellite system (GNSS) to determine its position. However, there are some venues, referred to as GNSS dead zones, in which the user device cannot receive communication signals from the GNSS satellites, such as in the interior of radio-opaque buildings. The GNSS functionality therefore provides no help in determining the position of the user device as it moves within such an environment. The industry has proposed alternative techniques to determine the location of the user device within GNSS dead zones. But there remains room for improvement regarding the manner in which these alternative techniques are invoked.

SUMMARY

The functionality described herein allows a user device to determine an appropriate juncture at which to initiate processing within a GNSS dead zone in an energy-efficient manner. This helps conserve the battery resources of the user device and provide satisfactory user experience.

In one implementation, the functionality employs a sensor management module for determining when to activate a device movement sensor module provided by a user device. Once activated, the user device uses the device movement sensor module to perform any environment-specific processing, such as a dead-reckoning process for determining incremental positions within the venue. Further, in a crowd-sourcing operation, the user device may report the incremental positions together with beacon information to remote processing functionality, where the beacon information is generated in response to signals received from one or more wireless signal sources. The positions and beacon information constitute collected information according to the terminology used herein.

According to another illustrative feature, the sensor management module adopts a different probing technique for each region that the user device traverses when advancing to a particular GNSS dead zone venue. The probing techniques provide position information of increasing robustness as the user draws closer to the venue. But this increased robustness may come at the cost of increased energy expenditure. When the sensor management module determines that the user device has reached a boundary of a region associated with the venue itself, it can turn on the device movement sensor module.

According to another illustrative feature, the remote processing functionality may instruct each user device to supply collected information with respect to a set of venues. In some cases, the set of venues for a first device may differ from the set of venues for a second device, at least in part.

According to another illustrative feature, the remote processing functionality may provide a quota to each user device. The quota describes a maximum number of information collection sessions that are to be performed by a user device in a prescribed time period. A user device can cease the above-summarized probing and collecting operations if it has met its quota.

According to another illustrative feature, each user device may monitor its battery level. The user device can cease the above-summarized probing and collection operations if the battery level falls below a prescribed threshold. It may resume the probing and collection operations when the battery is recharged.

The above approach can be manifested in various types of systems, components, methods, computer readable storage media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 1 also shows two merely illustrative ways in which a user may pass through these regions.

FIGS. 7-9 are procedures that describe three respective probing techniques that can be performed in three respective regions.

FIG. 10 shows a procedure for generating a position of the user device based on the detection of a wireless signal transmitted by a short-range beacon.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes illustrative functionality for governing the invocation of processing that is performed in a venue associated with a GNSS dead zone. Section B describes illustrative methods which explain the operation of the functionality of Section A. Section C describes illustrative computing functionality that can be used to implement any aspect of the features described in Sections A and B.

Figure 17:
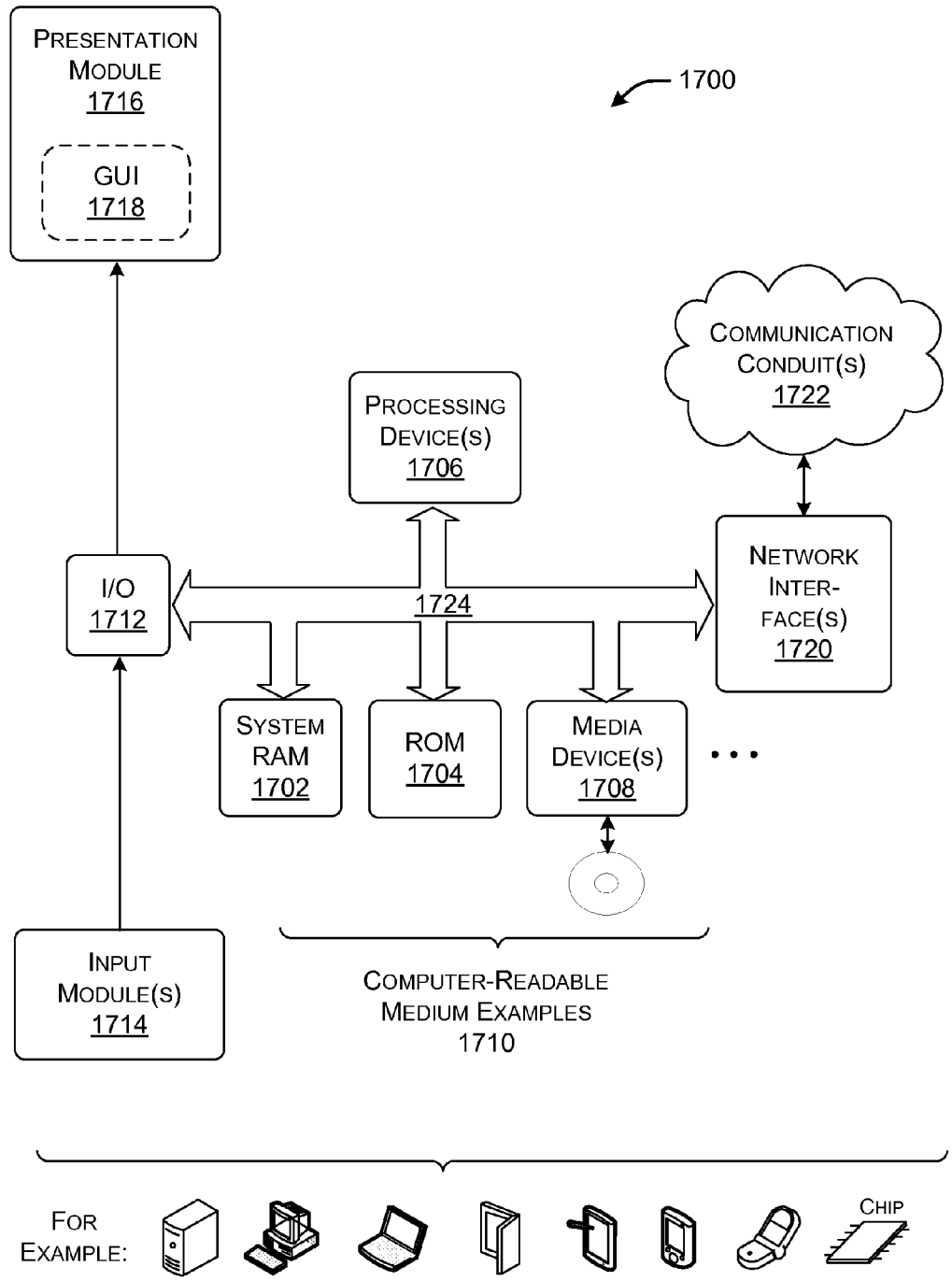
FIG. 17 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software, hardware (e.g., chip-implemented logic functionality), firmware, etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 17, to be discussed in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software, hardware (e.g., chip-implemented logic functionality), firmware, etc., and/or any combination thereof.

As to terminology, the phrase "configured to" encompasses any way that any kind of physical and tangible functionality can be constructed to perform an identified operation. The functionality can be configured to perform an operation using, for instance, software, hardware (e.g., chip-implemented logic functionality), firmware, etc., and/or any combination thereof.

The term "logic" encompasses any physical and tangible functionality for performing a task. For instance, each operation illustrated in the flowcharts corresponds to a logic component for performing that operation. An operation can be performed using, for instance, software, hardware (e.g., chip-implemented logic functionality), firmware, etc., and/ or any combination thereof. When implemented by a computing system, a logic component represents an electrical component that is a physical part of the computing system, however implemented.

The phrase "means for" in the claims, if used, is intended to invoke the provisions of 35 U.S.C. §112, sixth paragraph. No other language, other than this specific phrase, is intended to invoke the provisions of that portion of the statute.

The following explanation may identify one or more features as "optional." This type of statement is not to be interpreted as an exhaustive indication of features that may be considered optional; that is, other features can be considered as optional, although not expressly identified in the text. Finally, the terms "exemplary" or "illustrative" refer to one implementation among potentially many implementations.

A. Illustrative Functionality

Figure 1:
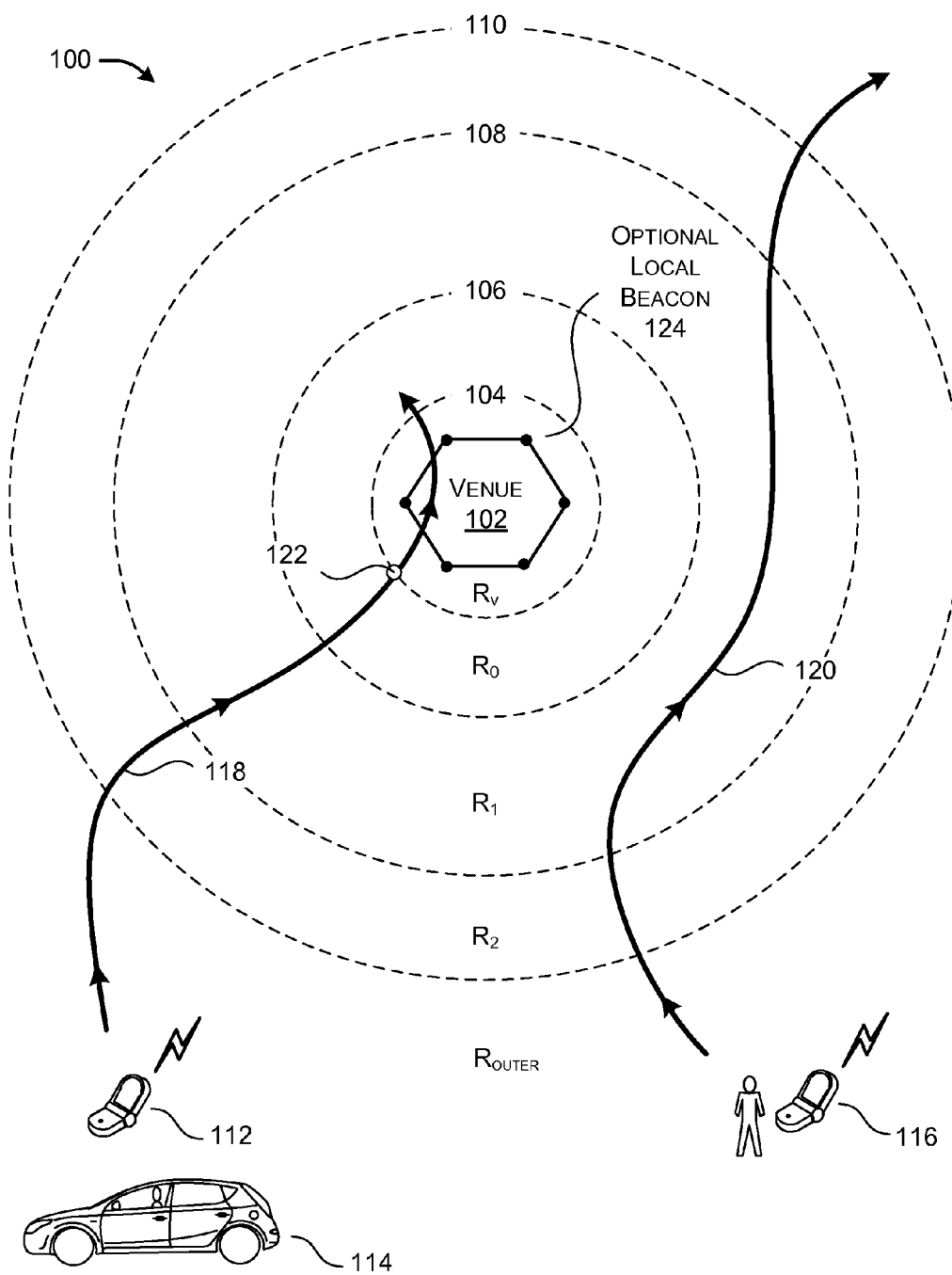
FIG. 1 shows a plurality of regions defined in relation to a GNSS dead zone venue.

FIG. 1 shows an environment 100 in which a plurality of regions are defined in relation to a venue 102. The venue 102 may correspond to a region in which a user device cannot rely on a global navigation satellite system (GNSS) to determine the position of the user device. For this reason, the venue 102 may be referred to as a GNSS dead zone or a GNSS-deprived region.

For example, in some cases, the venue 102 may correspond to a building, such as a store, a mall, an airport, a manufacturing facility, an academic building, a governing building, etc. The walls and ceiling of the building may block or severely attenuate the receipt of wireless GNSS signals from the satellite(s) which provide these signals. Alternatively, or in addition, the venue 102 may correspond to an outdoor region in which wireless GNSS signals are not reliably available, e.g., due to the topography of the region and/or interference caused by other communication sources. In some cases, the venue 102 uniformly fails to provide reliable wireless GNSS signals over the entire spatial extent of the venue 102, and with respect to time. In other cases, the venue 102 may have sub-regions in which the wireless GNSS signals are available and/or time spans in which the wireless GNSS signals are available. In contrast, assume that a user device has reliable access to wireless GNSS signals in regions outside the venue 102. While the user device may not be able to reliably receive GNSS signals in the venue 102, in some cases, it can still receive wireless cellular signals, WiFi signals, etc. in the venue 102.

In the merely representative case of FIG. 1, the regions are defined by a series of concentric circles (104, 106, 108, and 110). The venue 102 lies at the center of these concentric circles. Each region corresponds to a range of distances from the venue 102. More specifically, a region $R_{outer}$ corresponds to an area that lies beyond an outermost circle 110. A region $R_2$ lies between concentric circles 110 and 108. A region $R_1$ lies between concentric circles 108 and 106. A region $R_0$ lies between concentric circles 106 and 104. And a region $R_v$ lies inside the concentric circle 104. In one merely illustrative case, the outer circle 110 may have a radius of approximately one to two kilometers.

In other environments, the regions may have any shape (that is, not necessarily a circular shape). For example, a venue that lies on a shoreline may have regions defined by semicircles, rather than full circles. Further, other environments can adopt additional regions or fewer regions compared to the number of regions shown in FIG. 1. Further still, different environments can adopt regions of different sizes depending on various environment-specific factors. At a later juncture, the description will provide additional details regarding one way that the shapes, sizes, and placements of the regions can be computed.

A user may advance through the environment 100 together with a user device. For example, a first user may mount a user device 112 to the dash of a vehicle 114 while traveling through the environment 100. In another case, a second user may carry a user device 116 as he or she advances through the environment 100 on foot. Moreover, any user can use plural forms of transportation in the course of moving through the environment 100. For example, a user can use a vehicle to drive to a parking lot associated with a mall (where the mall is associated with the venue 102), and then advance into the mall on foot.

Without limitation, FIG. 1 shows that the first user traverses a path 118 which takes him or her into, and then out of, the venue 102. By contrast, the second user traverses a path 120 which does not intersect the venue 102. Consider the behavior of the user device 112 as it traverses the path 118. The user device 112 can use wireless signals (e.g., wireless GNSS signals, wireless cellular signals, etc.) to determine its position as its successively moves through regions $R_{outer}$, $R_2$, $R_1$, and $R_0$. Upon reaching the concentric circle 104 (which marks the outer boundary of region $R_v$), the user device 112 may transition to a dead-reckoning technique to determine the position of the user device as it moves into the venue 102. The dead-reckoning technique is not dependent on the availability of wireless GNSS or cellular signals.

More specifically, the user device 112 can commence the dead-reckoning technique at an anchor position 122 along path 118, which corresponds to a known position established by wireless GNSS signals or some other position-determination technique. After moving from this anchor position 122, the user device 112 determines its new current position based on its previous position (in this case the known anchor position 122) in combination with the output of one or more device movement sensor devices. Such device movement sensor devices can include one or more accelerometers, one or more gyroscopes, one or more magnetometers, one or more barometers, and so on. But to facilitate explanation, this description will refer to the suite of possible device movement sensor devices as a generic "device movement sensor module."

That is, to compute a new current position, the user device 112 can convert the output of the device movement sensor module into incremental movement information, and then add this incremental movement information to the previous position to derive the new current position. The user device 112 can continue this process to generate a series of incremental positions. At certain points within the venue, the user device 112 may gain access to a known reference position provided by any position-determination mechanism(s). The user device 112 can use this known reference position to remove or reduce accumulated error in its current position.

Before reaching the boundary of region $R_v$, the user device 112 performs probing at different points along the path 118 to determine the juncture (at anchor position 122) at which it is appropriate to turn on the device movement sensor module and commence the dead-reckoning procedure. The user device 112 performs this probing by selecting different probing techniques for different respective regions. For example, the user device 112 may use a technique $T_{outer}$ when travelling through the outer region $R_{outer}$, a technique $T_2$ when traveling through the region $R_2$, a technique $T_1$ when traveling through the region $R_1$, and a technique $T_0$ when traveling through the region $R_0$. And, as said, when the user device 112 enters the region $R_v$, it may commence the dead-reckoning procedure.

In one approach, different probing techniques may provide positions at different respective levels of robustness. Here, "robustness" may describe the frequency and/or accuracy at which a probing technique provides the positions. But, at the same time, different probing techniques also may incur different expenditures of energy. More specifically, the more robust techniques may consume more energy than the less robust techniques.

In one implementation, each user device is configured to use probing techniques of increasing robustness and energy consumption as the user device draws closer to the venue 102. This means that the probing technique $T_{outer}$ performed in the region $R_{outer}$ will consume the least amount of energy, while the probing technique $T_0$ will consume the greatest amount of energy. But the probing technique $T_0$ will be more robust than the probing technique $T_{outer}$. This behavior is useful to help conserve the limited power resources of each user device.

To illustrative the energy-conserving features of the above-described strategy, consider the behavior of any user device in the region $R_{outer}$. In this region, there is a relatively high degree of uncertainty as to whether the user is planning on traversing a path which will lead to the venue 102. For path 118, the user device 112 will indeed advance to the venue 102; but for path 120, the user will not continue on to the venue 102. Further, because the user is far from the venue 102, there is ample time to resolve the true travel intentions of the user. Due to these factors, it is appropriate to use a low-energy/low-sampling-rate probing technique for region $R_{outer}$. By contrast, in region $R_0$, there is a much lower degree of uncertainty as to whether the user will enter the venue 102, and much less time to determine the true travel intentions of the user. For this reason, it is appropriate to use a high-energy/high-sampling-rate probing technique for region $R_0$, relatively speaking.

In particular, the user device 112 can apply a relatively high-sampling-rate probing technique in region $R_0$ to accurately detect an anchor position (such as illustrative anchor position 122) at which it is to commence the dead-reckoning procedure. That is, the GNSS signals are still available at the anchor position 122, but may not be reliably available as the user advances closer to the venue 102. If the user device 112 advances into the region $R_v$ without having first detected an anchor position, it may lose its opportunity to capture an initial seed position for use in performing the dead-reckoning process, and hence it may be forced to forgo the dead-reckoning process in this particular instance. This unfavorable consequence justifies the use of the high-sampling-rate probing technique in $R_0$. Note that it is possible to use the high-energy/high-sampling-rate probing technique for all regions of the environment 100, but this would result in the rapid depletion of the power resources of the user device.

The user devices can perform the dead-reckoning procedure within the venue 102 to serve different objectives. In one case, a user device can use the dead-reckoning procedure in the venue 102 to simply determine its position within the venue, with no other collateral goal.

In addition, or alternatively, the user device can use to the dead-reckoning position to identify positions in the venue 102, together with beacon information associated with each of the positions. The beacon information constitutes a "fingerprint" which characterizes the different wireless signals that are received at a particular position. More specifically, the beacon information may include information which identifies the sources of the wireless signals. The beacon information may also include information regarding the respective strengths of the wireless signals that have been received from the identified sources. Together, each pair of a position and its associated beacon information constitutes collected information according to the terminology used herein. The user device may then forward the collected information to remote processing functionality (to be described below). That remote processing functionality may aggregate the collected information received from plural user devices that have traversed the venue 102. This aggregation operation constitutes a crowd-sourcing operation that yields detailed position information about the venue 102.

Different applications can make use of the position information provided by the above-described crowd-sourcing operation in different ways. For example, in one case, a user device can determine beacon information within any venue, but without knowing its position. The user device can consult a database produced by the crowd-sourcing operation to determine a beacon signature which matches the detected beacon information, and a position associated therewith. That position corresponds to the approximate current position of the user device.

Figure 2:
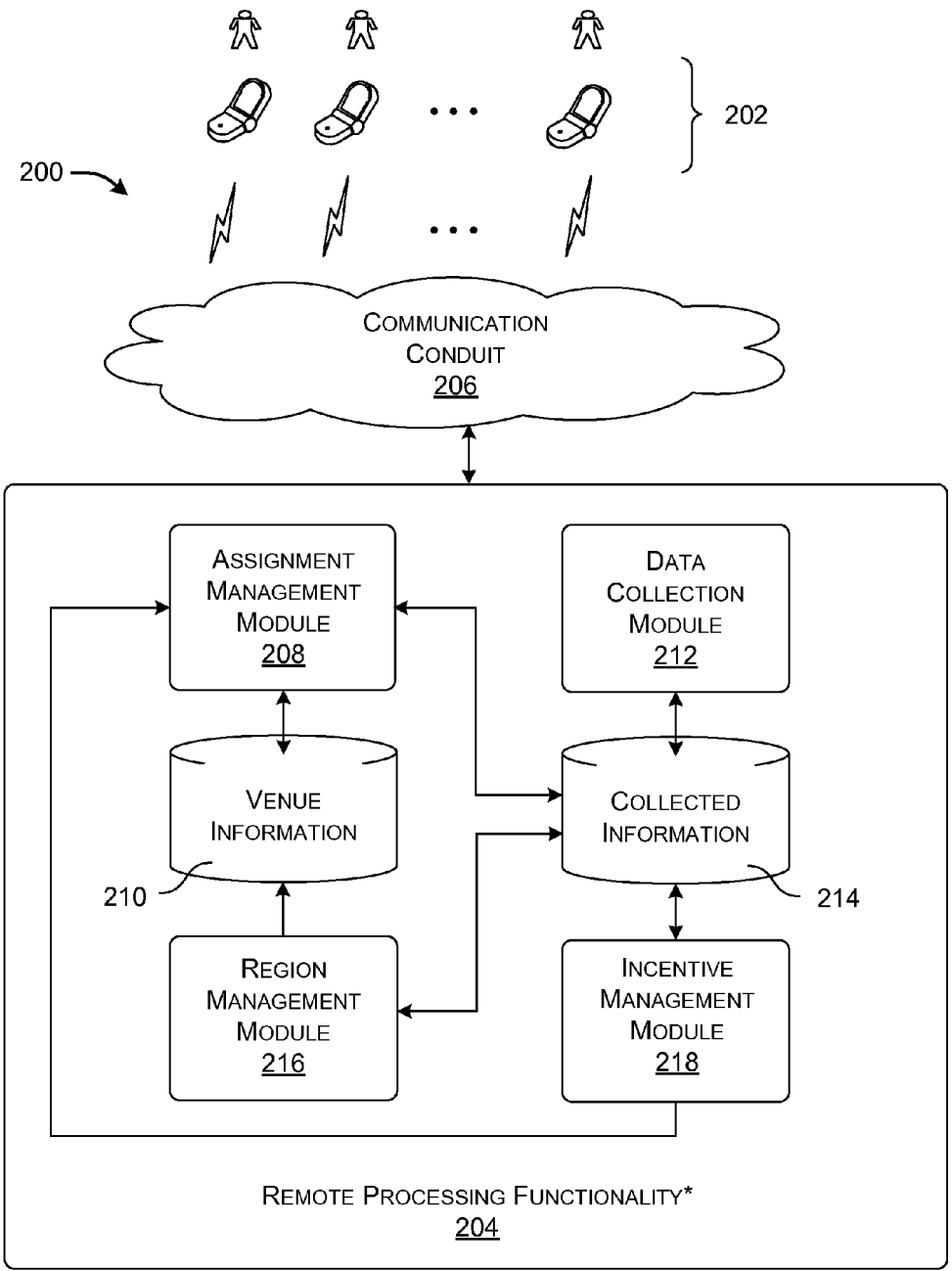
FIG. 2 shows an illustrative system that can implement the principles described herein. The system includes a plurality of user devices that are coupled to remote processing functionality.

FIG. 2 shows an illustrative system 200 that can implement the principles introduced with respect to FIG. 1. The system 200 includes a plurality of user devices 202 operated by respective end users. These user devices 202 are portable user devices that a user can transport with him or her through the environment 100. Without limitation, representative types of user devices include smartphones, tablet-type or slate-type computing devices, personal digital assistant devices, electronic book reader devices, laptop computer devices, netbook-type computing devices, vehicle-mounted navigation systems or other vehicle-borne computing equipment, wearable computing devices, etc.

The user devices 202 may communicate with remote processing functionality 204 (and with each other) via a communication conduit 206. The remote processing functionality 204 may correspond to one or more server computers and associated data stores. More specifically, in some cases, the remote processing functionality 204 can include cloud computing resources. The remote processing functionality 204 can be implemented at one site or may be distributed over plural sites. Further, the remote processing functionality 204 may be administered by a single entity or plural entities.

The communication conduit 206 can include a local area network, a wide area network (e.g., the Internet), or a combination thereof. As at least part thereof, the communication conduit 206 can include wireless communication infrastructure. The wireless communication infrastructure can include any combination of satellite communication equipment, cell towers, base stations, central switching stations, wireless access points (for WiFi communication), and so on.

The parenthetical footnote to FIG. 2 indicates that at least some features described as being performed by the remote processing functionality 204 can instead, or in addition, be performed by user devices, and vice versa. With that caveat, FIG. 2 summarizes four basic functions that may be performed by the remote processing functionality 204. In one function, an assignment management module 208 assigns different information collecting roles to different groups of user devices. For example, assume that the system 200 generally serves a particular region of a country that includes a master set of dead zone venues. The assignment management module 208 can identify different groups of user devices. The assignment management module 208 can then allocate a subset of master set of venues to each group of user devices, e.g., such that group A is assigned venues 1-10, group B is assigned venues 11-20, and so on. In other cases, the venues assigned to different groups can at least partially overlap.

After assignment, a user device in a particular group is tasked with the responsibility of supplying collected information regarding only those venues in its assigned subset of venues. For example, a user device within the above-mentioned group A is assigned the task of supplying collected information regarding only venues 1-10. To repeat, the collected information may constitute positions and beacon information collected by a user device as it traverses a particular venue. The user device generates the positions, in turn, using a dead-reckoning technique. In some implementations, the user devices can also forward collected information to the remote processing functionality 204 in regions that lie outside of the venues, e.g., in any of the regions $R_{outer}$ through $R_O$; the positions provided by the collected information in these cases can be determined based on wireless GNSS signals and/or any other position-determination mechanism(s).

The assignment management module 208 can perform the above-described allocation function in different ways. In one case, the assignment management module 208 can determine the area in which each user device typically operates. The assignment management module 208 can then assign venues to user devices which are within or nearby the areas in which the user devices typically operate. For example, consider a user who most often uses his or her smartphone in a 30 mile radius around his or her place of residence. The assignment module 208 may assign a subset of venues that lie within this 30 mile radius to this particular user device. In a yet more direct approach, the assignment management module 208 can determine the venues that a user typically visits, and/or the venues that a user is likely to visit based on any indirect evidence (e.g., based on demographic information, purchase history information, browsing history information, traveling history information, etc.). The assignment management module 208 can then assign a subset of those venues to the user device. The assignment management module 208 can use any technique for assigning venues to user devices, such as by randomly assigning viable venues to user devices. This assignment technique will result in the assignment of each venue to plural user devices.

In addition, or alternatively, the assignment management module 208 takes into consideration need-based factors in assigning user devices to venues. For example, consider a newly built or redesigned shopping mall. The assignment management module 208 initially will not have a robust database regarding positions and beacon signatures within this venue. In response, the assignment management module 208 can assign that venue to a relatively large group of user devices. This will result in the rapid accumulation of collected information for that venue. Next consider a popular establishment that has been in existence for many years. The assignment management module 208 may already have a robust database of positions and beacon signatures regarding this site. In this circumstance, the assignment management module 208 may assign the venue to fewer user devices compared to the above-mentioned start-up case, but it can continue to assign the venue to enough user devices so as to properly detect changes that may be made to the venue. For example, the venue may change by including additional wireless communication sources (such as additional WiFi access points), by changing the locations of existing communication sources, by changing the strengths of signals transmitted by the communication sources, by changing the physical layout of the venue, and so on. Also, the assignment management module 108 may wish to continue sampling positions from a well-trafficked venue to fill in information regarding sub-regions within those venues that are nevertheless relatively unpopular (such as certain stores in a mall).

The assignment management module 208 can also maintain venue information regarding each venue in a data store 210. The venue information includes different components which characterize each venue. Generally stated, the venue information can convey any information that enables a user device to perform probing so as to discover a juncture at which to commence the dead-reckoning process in connection with each venue.

For example, the venue information for a particular venue may include: a) an identifier associated with the venue; b) an address (e.g., a URL) at which a map of the venue may be obtained; c) position data; d) a venue proximity model; and e) venue beacon observation status information. The position data may describe the placement of the venue within a larger geographic area. The position data may also define the perimeter of the venue. The venue proximity model may store any descriptive information regarding the shapes, sizes, and placements of different probing regions associated with the venue, and/or any settings and instructions which describe the probing behavior that a user device is expected to perform in each of these regions. For example, the venue proximity model may describe the probing regions by defining positions associated with the probing regions, together with beacon signatures associated with those positions. In addition, or alternatively, a user device can apply one or more default rules to define these regions, such as by defining a particular probing region as a range of radii, measured with respect to a center location associated with a venue, etc. The beacon observation status information may indicate the relative level of robustness of the database of collected information for the venue. For example, the beacon observation status information for the new mall in the above example would indicate that the database for this venue is deficient, and is thus a worthy recipient of additional collected information.

The assignment management module 208 can send a subset of the venue information to each device. That subset pertains to the subset of venues that have been assigned to each user device. The received venue information informs the user device of the venues to which it has been assigned. And as stated, the received venue information also equips the user device with the appropriate information to perform probing with respect to the assigned venues.

In addition, the assignment management module 208 can assign a quota to each user device, and then download quota information which describes that quota to the user device. That is, in one implementation, the quota defines a number of information collection sessions that a user device is allowed to perform with respect to its assigned set of venues over a defined period of time. For example, assume that a particular user device is assigned a quota of 5 and is requested to supply collected information (for crowd-sourcing purposes) regarding venues X, Y, and Z. This means that the user device is instructed to supply positions and beacon information upon entering any of venues X, Y, and Z, but no more than five times in total. In one environment, the user device is considered to have engaged in an information collection session when it has entered some region associated with one of its assigned venues. Without limitation, in one illustrative implementation, the user device is considered to have engaged in an information collection session when it has entered the region $R_1$, upon which the GNSS-based active probing is commenced. But different implementations can move this "trigger point" closer to or farther away from a venue to suit different environment-specific objectives. However, the occurrence of such a triggering event does not necessarily mean that the user will subsequently enter the region $R_v$ and commence the dead-reckoning process. For example, a user may enter the region $R_1$ but decline to continue on farther into the venue. Alternatively, the user may enter the venue but, for any environment-specific reason, the dead-reckoning process is not successful in generating viable collected information for the interior of the venue, e.g., because of a failure to extract meaningful movement information and/or a failure to receive viable wireless signals within the venue and/or a failure to establish an anchor position prior to entering the venue, etc.

The assignment management module 208 can also assign different quotas to different types of devices. For example, the assignment management module 208 can assign a larger quota to a tablet-type computing device compared to a smartphone, because the tablet-type computing device presumably has a larger battery capacity than the smartphone. The assignment management module 208 can also assign different quotas to different user devices depending on the preferences of the users who are associated with those devices.

Further, the assignment management module 208 can specify a maximum power expenditure that each user device is permitted to use in performing the probing and collecting activities. The assignment management module 208 can specify the maximum power expenditure in various ways, such as by specifying a maximum amount of time that can be spent in performing probing and collecting activities, and/or by more directly specifying an amount of power that a user device is allowed to expend in performing probing and collecting activities (e.g., quantified based on battery level, processing load, etc.). The assignment management module 208 can formulate these power constraints as part of the quota information that it sends to the user device.

Further, the assignment management module 208 can provide information which specifies the period of applicability of each quota. For example, the assignment management module 208 can specify a quota of five venues per month, a month corresponding to the period of applicability in this example. At the end of each month, a user device will reset its work-performed count or measurement to zero or alternatively receive a new quota.

Further, the assignment management module 208 can periodically or continuously tune the manner in which it allocates venues and quotas to user devices based on feedback information regarding the quantity and quality of collected information received from the user devices.

In one illustrative implementation, the probing and collecting operations performed by the system 200 occur as background processes that need not engage the attention of the users. Alternatively, or in addition, the probing and collecting operations can be performed by an application or other function that is expressly invoked by the user.

In summary, the assignment management module 208 assigns venues to user devices to help efficiently distribute the data collection task among user devices in an entire population of user devices. The assignment management module 208 assigns one or more quotas to each user device to limit the amount of data-collecting work that each user device is asked to perform, and hence the power drain associated with that work.

In any case, however, a user can be given the opportunity to expressly "opt in" and/or "opt out" with respect to any aspect of the processing described herein. Further, in some alternative cases, the assignment management module 208 can allow any user device to provide collected information pertaining to any venue that it enters, e.g., without constraining the user device to a particular subset of venues and/or without specifying a quota for the user device. And as mentioned above, the remote processing functionality 204 can also receive collected information from user devices while in regions outside of the venues.

A data collection module 212 receives the collected information supplied by the user devices. The data collection module 212 can then store the collected information in a data store 214. The data collection module 212 can use any technique to receive the collected information, such as a push technique (whereby the user devices independently supply the collected information), a pull technique (whereby the data collection module 212 polls the user devices to collect the information), or combination thereof.

A region management module 216 refines any characteristic(s) of the venue information based on the crowd-sourced collected information provided by a plurality of user devices. For example, the region management module 216 can examine the collected information to identify regions in which the wireless GNSS signals are not being reliably received. This may allow the region management module 216 to identify new venues to be investigated using the dead-reckoning technique. That is, the region management module 216 can convey these new venues to the assignment management module 208, whereupon the assignment management module 208 can instruct certain devices to provide collected information for the new venues in the above-described manner.

In addition, or alternatively, the region management module 216 can examine the collected information to determine the efficiency and accuracy at which user devices are discovering known GNSS-deprived venues. For example, the collected information may reveal the probabilities that users will enter a particular venue for different positions in proximity to the venue. In addition, the collected information may reveal the prevalence at which user devices enter a venue without first establishing an anchor position. In addition, the collected information may directly and/or indirectly reveal the amounts of resources consumed by the user devices in attempting to locate an anchor position for a particular venue, and so on.

The region management module 216 can use the above-described collected information (and conclusions derived therefrom) to modify the venue proximity model for a particular venue in any manner, such as by modifying the shapes, placements, sizes, etc. of the different probing regions associated with a particular venue. The region management module 216 can also use the collected information to determine the number of probing regions that are to be used in association with a particular venue. The region management module 216 can also use the collected information to provide beacon signatures associated with different positions within different probing regions; henceforth, a user device can consult that signature information to determine its position within a particular probing region associated with a particular venue.

To name just a few representative examples, the region management module 216 may increase the radius of circle 106 associated with region $R_0$ to improve the ability of user devices to reliability detect an anchor position associated with the venue 102.

An incentive management module 218 can provide any type of reward to a user for taking part in the above-described information collection tasks. For example, the incentive management module 218 can give the user a coupon, rebate, discount, etc. in response to entering an assigned venue or plural assigned venues. Generally, the reward can specify any benefit to the user, and may be conferred by any granting entity (e.g., any cooperating store, service, etc.).

In operation, the incentive management module 218 can optionally send a qualifying user device a message that alerts its user to the existence of a reward and its terms of compliance. This may encourage the user to visit a particular venue associated with the reward. The incentive management module 218 can then examine the collected information in the data store 214 to glean evidence that indicates that the user has entered a venue associated with the reward. The incentive management module 218 can then deliver the reward to the user in any environment-specific manner, such as by electronically transferring and/or physically mailing information regarding the reward (and/or the reward itself) to the user.

In other cases, the incentive management module 218 can structure an incentive program as a game, e.g., as implemented as a game-like application or a game that is specified by textual instructions. That game can encourage users to visit locations. For example, the game may be structured as a scavenger hunt, a puzzle, an adventure, a competition, etc. The reward conferred in this context may correspond to any of the assets described above (e.g., coupons, discounts, rebates, etc.). In addition, or alternatively, the reward may simply constitute recognition that the user has completed a game-related task, achieved a certain score, etc.

Figure 3:
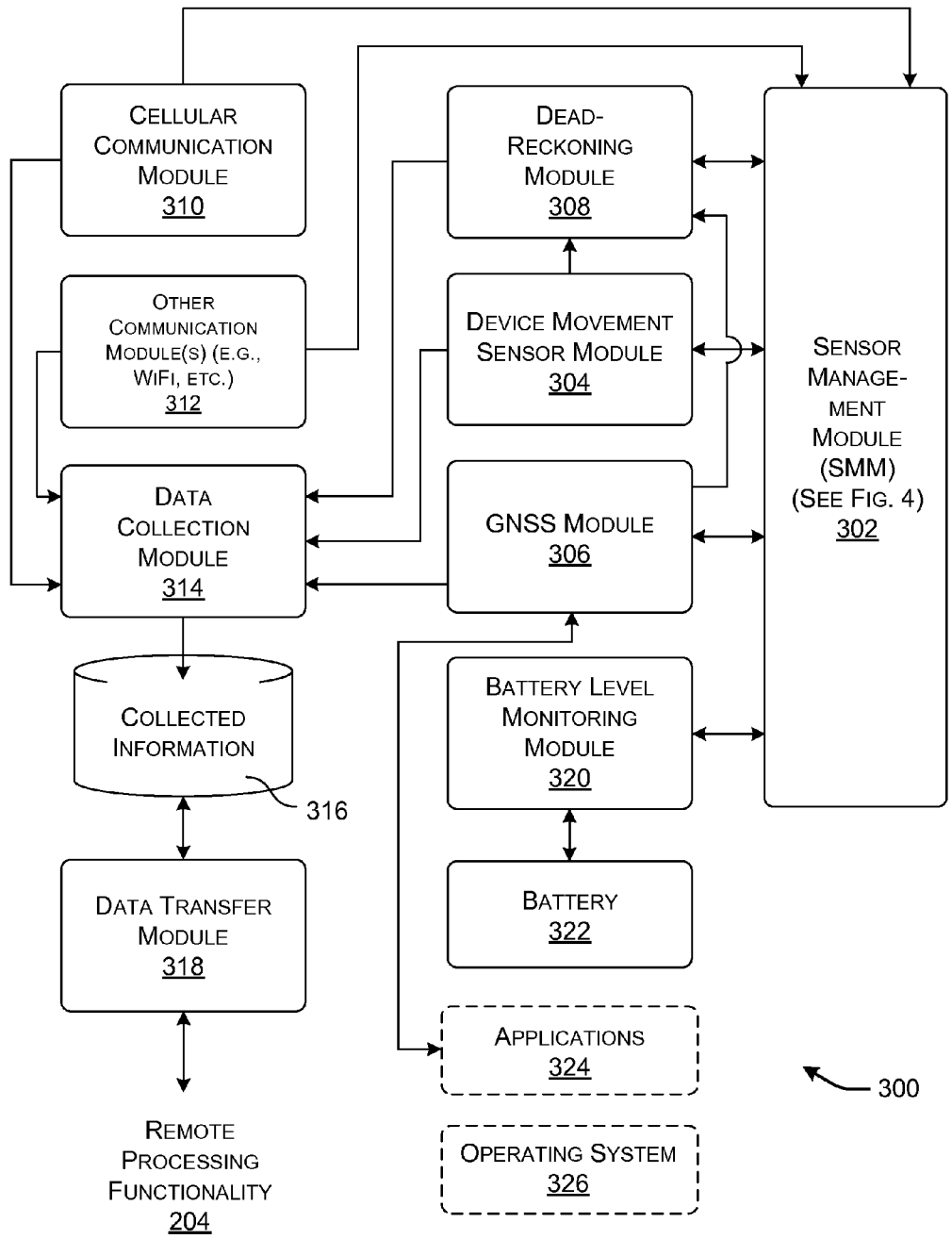
FIG. 3 shows one illustrative implementation of a representative user device shown in FIG. 2.

FIG. 3 shows one illustrative implementation of a representative user device 300, such as one of the user devices 202 of any type shown in FIG. 2. As indicated in that figure, the user device 300 can include (or can be conceptualized as including) a plurality of modules that perform different functions. As a first qualification, at least some of the functions attributed to the user device 300 can instead, or in addition, be performed by the remote processing functionality 204. As a second qualification, any of the functions attributed to the user device 300 can instead, or in addition, be performed by ancillary components which work in conjunction with the user device 300, but may not represent components within the housing of the user device 300 per se. As a third qualification, FIG. 3 omits certain modules that do not have a direct role in deciding when to commence the dead-reckoning process, such as various input devices and output devices provided by the user device 300.

Figure 4:
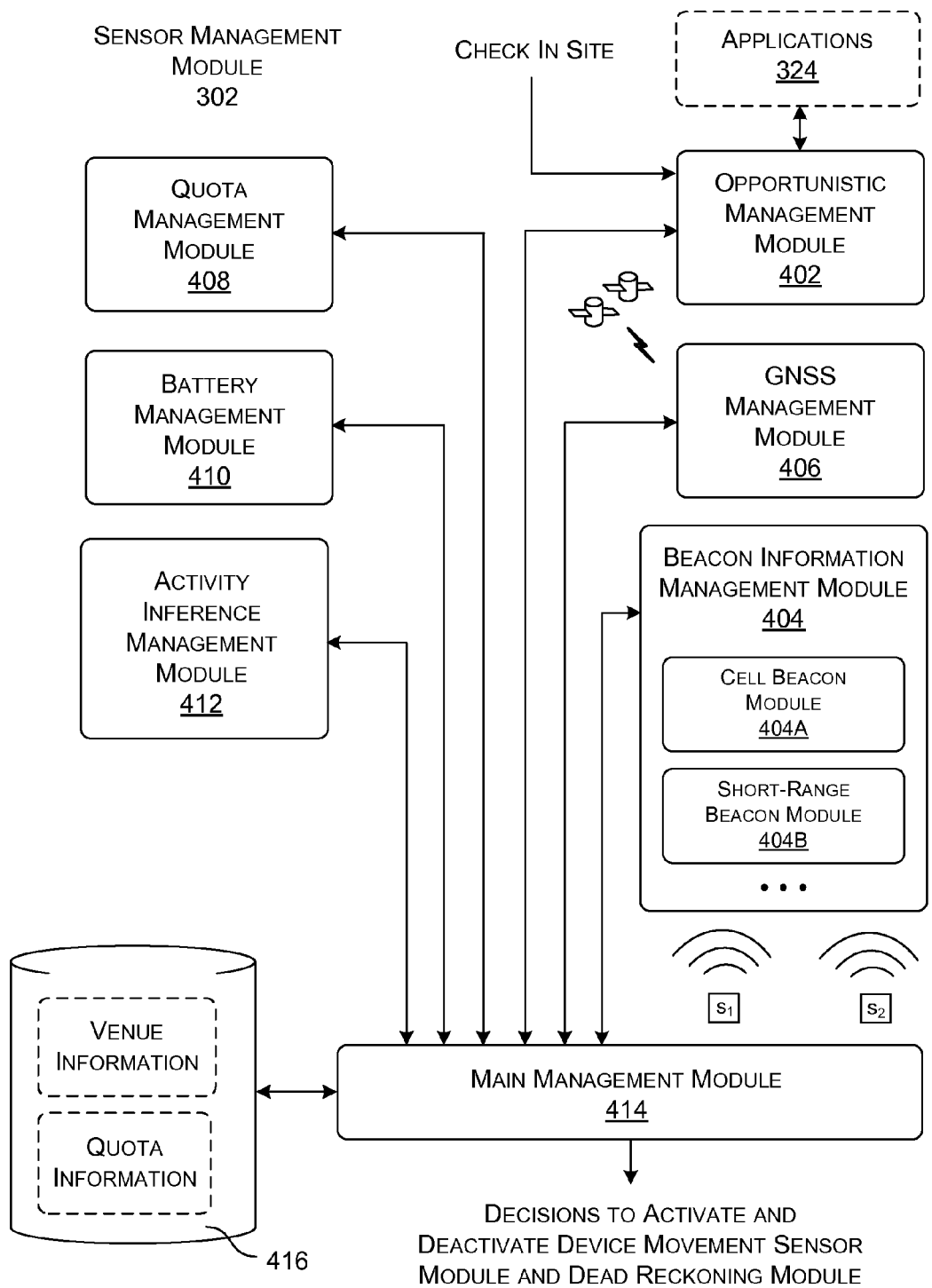
FIG. 4 shows one illustrative implementation of a sensor management module. The sensor management module may correspond to one component of the user device shown in FIG. 3.

The user device 300 includes a sensor management module (SMM) 302 which governs the activation and deactivation of a device movement sensor module 304. FIG. 4 (described below) provides additional information regarding one illustrative composition and manner of operation of the SMM 302. The device movement sensor module 304 itself can include any combination of sensor devices that monitor the movements and/or orientation of the user device 300, such as, without limitation, one or more accelerometers, one or more gyroscope devices, one or more magnetometers, one or more barometers, and so on. For convenience, the explanation will continue to refer to the device movement sensor module 304 as a single entity, although, as said, it can encompass plural sensor devices.

The user device 300 also may include a GNSS module 306. The GNSS module 306 determines the position of the user device 300 based on wireless GNSS signals received from one or more satellites. For example, the GNSS module 306 can be implemented using Global Positioning System (GPS) functionality or the like.

A dead-reckoning module 308 determines the position of the user device 300 using any type of dead-reckoning technique, such as the technique described above. To perform this function, the dead-reckoning technique receives movement information from the device movement sensor module 304. When available, the dead-reckoning module 308 module can also receive wireless GNSS signals and/or wireless cellular signals while in the venue (if available). This allows the user device 300 to correct any error that may have accumulated in the dead-reckoning process and/or to determine when the user device 300 has exited the venue in question. The user device 300 can also optionally supplement the dead-reckoning process with any other position-determining technique to determine positions within a venue. The user device 300 can then use any fusion algorithm to combine positions provided by two or more position-determination techniques.

The dead-reckoning module 308 can terminate the dead-reckoning process in various circumstances, such as when the error of the positions provided by this process exceed a threshold, and/or when position information derived from any position-determination technique indicates that the user device 300 has exited the GNSS-deprived venue. The dead-reckoning module 308 can also deactivate the device movement sensor module 304 at this time.

In addition, the SMM 302 can deactivate the dead-reckoning module 308 and the device movement sensor module 304 when it detects that the user device 112 has left the venue 102. The SMM 302 can draw this conclusion based on a determination that the user device 112 is receiving reliable wireless GNSS signals from the GNSS module 306. In addition, or alternatively, the SMM 302 can deactivate the dead-reckoning module 308 and the device movement sensor module 304 when it detects that the position of the user device 112 (determined by any position-determining mechanism(s)) is suitably outside the venue 102. The SMM 302 can make this determination, in turn, based on map information provided by the venue information.

A cellular communication module 310 enables the user device 300 to communicate with any remote entity (such as any other user device or the remote processing functionality 204) using wireless cellular communication. The cellular communication module 310 can use any cellular protocol to perform this task. The cellular communication module 310 can also be used to generate beacon information which characterizes the wireless cellular signals that are received from one more wireless communication sources (such as different cell towers or the like) with respect to a particular position of the user device 300. The beacon information describes the identity of each detected wireless communication source. The beacon information may also describe the strength of each wireless cellular signal.

The user device 300 may also include one or more other communication modules 312, referred to in the singular below for brevity. For example, the other communication module 312 may comprise WiFi functionality which communicates with one or more wireless WiFi access points in the vicinity of the user device 300. Like the cellular communication module 310, the other communication module 312 can be also used to generate beacon information which characterizes the wireless WiFi signals that are received from one or more WiFi access points with respect to a particular position of the user device 300.

In addition, or alternatively, the other communication module 312 can detect signals transmitted by one or more short-range beacons provided in the vicinity of the user device 300, such as Near Field Communication (NFC) tags, Bluetooth Low Energy (BLE) devices, etc. For instance, in some cases, these short-range beacons may have a range of transmission that extends only a few meters from the beacons. In the merely illustrative case of FIG. 1, the venue 102 may include short-range beacons at various points on or near the perimeter of a building associated with the venue 102, e.g., at various entranceways, etc. Short-range beacon 124 is one such beacon. Further, one or more short-range beacons may be provided in the interior of the venue 102.

A data collection module 314 can receive and store information in a data store 316, for use in a crowd-sourcing operation. The collected information includes positions identified by the dead-reckoning module 308 within the venue, together with beacon information associated with those positions (which may be provided, for instance, by the other communication module 312 based on the wireless WiFi signals emitted by access points within the venue). (As stated above, the data collection module 314 can also collect and store crowd-sourcing information when the user device 300 is outside the venue.) A data transfer module 318 transfers the collected information provided in the data store 316 to the remote processing functionality 204 using any technique, such as a push technique, a pull technique, or combination thereof, based on any triggering event(s).

A battery level monitoring module 320 receives information regarding a battery level of a rechargeable battery 322. The battery 322 supplies power to the user device 300.

The user device 300 may also include one or more applications 324 that perform any functions. In some cases, an application may interact with the GNSS module 306 (and/or some other position-determination module) to determine the position of the user device 300. For example, a map application may interact with the GNSS module 306 to determine the current location of the user device 300. This enables the map application to provide a map to the user which is pertinent to the user's present location. The applications 324 may run with the assistance of low-level resource management functions provided by an operating system 326. Various functions of the operating system 326 and/or other functionality may also optionally interact with the GNSS module 306 for any purpose. For example, camera functionality may interact with the GNSS module 306 so as to annotate a picture with position information, describing the position at which the picture was taken.

Advancing to FIG. 4, this figure shows one illustrative implementation of the SMM 302 of FIG. 3. The SMM 302 can include (or can be conceptualized as including) one or more components that perform different respective functions. The SMM 302 is depicted as a component within the user device 300, but, to repeat, any functions performed by the user device 300 can, instead, or in addition, be performed by the remote processing functionality 204.

The different components of the SMM 302 play different respective roles in various probing techniques. As described above in connection with FIG. 1, the user device 300 applies a probing technique to determine when it is appropriate to turn on the device movement sensor module 304 and commence the dead-reckoning process. As a main goal, the SMM 302 attempts to efficiently perform this task so as not to deplete the battery 322 of the user device 300. But the SMM 302 will not adopt an approach that is so lax that a significant number of user devices fail to detect an anchor position before entering a venue.

As a first component, an opportunistic management module 402 determines whether the user has activated any function that involves determining the position of the user device 300, such as an application, operating system function, etc. But to simplify explanation, it will henceforth be assumed that the invoking function is an application. The application determines the position of the user device 300 for a purpose that is unrelated to the task of performing dead-reckoning or crowd-sourcing within the venue. For example, as stated above, a map application may interact with the GNSS module 306 to determine the position of the user device 300 for the purpose of displaying an appropriate map to the user. The opportunistic management module 402 opportunistically uses the position reading obtained by any such "unrelated" application for its own use, e.g., to determine the proximity of the user device 300 with respect each of the venues that the user device 300 has been asked to monitor.

In addition, or alternatively, the opportunistic management module 402 can receive position information when a user independently "checks in" at a particular site, such as a restaurant, store, etc. That is, the user may manually provide any type of input which indicates that he or she is present at a particular locale. The opportunistic management module 402 can then consult a local and/or remote lookup table to map that location into a position associated with the presumed position of the user device 300. The opportunistic management module 402 can again parasitically use this position to assess the location of the user device 300 with respect to a venue in question.

In one case, the SMM 302 can call on the opportunistic management module 402 to provide positions when the user is relatively far from a venue, such as in the region $R_{outer}$. This probing technique may not provide frequent position updates, and it does not provide the position updates in an on-demand manner. But it does provide these updates in an energy efficient manner. This is because the user device 300 does not expend any additional energy (or any significant additional energy) in obtaining the positions beyond what energy has already been expended by the "host" application (e.g., the map application in the example above). But the SMM 302 can also call on the opportunistic management module 402 to provide opportunistic position readings in any region (e.g., regions $R_2$, $R_1$, $R_0$, and $R_v$), e.g., so as to supplement the position information provided by other position-determination mechanisms that are used in those other regions.

A beacon information management module 404 obtains the position of the user device 300 based on beacon information. As described above, the beacon information identifies the communication sources associated with wireless cellular signals and/or WiFi signals received by the user device 300 at a particular position. The beacon information also describes the strengths of those wireless signals. The beacon information management module 404 can compare the detected beacon information with beacon signatures associated with a venue in question, as specified by the venue information. Each beacon signature comprises reference beacon information that has been collected on a prior occasion by one or more user devices, together with a known position associated with the reference beacon information. If there is a match between the measured beacon information and a particular beacon signature, the beacon information management module 404 can treat the position of the matching beacon signature as the current approximate position of the user device 300. In one approach, the SMM 302 applies the beacon information management module 404 to provide approximate positions with the region $R_2$ shown in FIG. 1, with the primary objective of determining if the user device has entered region $R_1$.

In addition, the beacon information management module 404 can detect short-range beacons. Each short-range beacon has a known source position. Further, each short-range beacon can transmit identity information which identifies the short-range beacon, distinguishing it from signals provided by other short-range beacons. In operation, the beacon information management module 404: (1) detects a wireless signal transmitted by one of these short-range beacons; (2) determines the identity of the short-range beacon and its preregistered position; and (3) treats the discovered position as the estimated current position of the user device 300. In one implementation, the SMM 302 can perform the above-described detection of short-range beacons in any region shown in FIG. 1. In another case, the SMM 302 can selectively look for short-range beacons only when it has entered region $R_0$ or region $R_1$ or some other region that is close to the venue. In some cases, short-range beacons can be placed at anchor positions associated with a venue. Thus, when the beacon information management module 404 detects such a beacon, it will determine that it has satisfactorily detected an anchor position at which the dead-reckoning process can commence.

FIG. 4 complements the above description by showing that the beacon information management module 404 can include two or more sub-modules for determining position information based on different types of wireless signals. For example, a cell beacon module 404A determines positions based on wireless cellular signals, a short-range beacon module 404B determines positions based on wireless signals from short-range beacons, and so on. As mentioned above, the SMM 302 can activate the cell beacon module 404A when the user device 300 is present in region $R_2$, for the purpose of determining when (and if) the user device 300 moves into region $R_1$. The SMM 302 can activate the short-range beacon module 404B when the user device 300 enters region $R_1$ or $R_0$, for the purpose of detecting the presence of a short-range beacon source. The cell beacon module 404A consumes less energy than the short-range beacon module 404B. This is because the user device 300 already receives and processes wireless cellular signals as part of its background communication functions; but this is not also true with respect to the detection function performed by the short-range beacon module 404B. The positions provided by the cell beacon module 404A, however, may be less accurate than the positions provided by the short range beacon module 404B.

A GNSS management module 406 manages the use of the GNSS module 306 to collect positions. For example, the GNSS management module 406 specifies the regions for which the GNSS management module 406 is applied, together with the frequency at which it is applied in each region. For example, the GNSS management module 406 can instruct the user device 300 to use the GNSS module 306 to determine the position of the user device 300 in the region $R_1$ at a frequency $f_1$, and to determine the position of the user device 300 in the region $R_0$ at a frequency $f_0$, where $f_0 > f_1$. The user device 300 expends more energy performing its probing technique in region $R_0$ compared to region $R_1$, since the GNSS module 306 performs more work in region $R_0$.

Alternatively, or in addition, the GNSS management module 406 can collect positions using the GNSS module 306 at a variable rate which depends on the distance d between the user device 300 and the venue in question (as opposed to providing only two discrete sampling frequencies for regions $R_1$ and $R_0$).

The beacon information management module 404 can also sample positions in the manner described above with respect to the GNSS management module 406, e.g., by determining positions at a frequency that depends on the distance between the user device 300 and the venue.

A quota management module 408 monitors how many information collection sessions (ICSs) have been performed by the user device 300. If this number has met the quota assigned to the user device 300, then the quota management module 408 will suspend further probing and collecting operations performed by the user device 300 (referred to as "probing/collecting operations") until the quota is replenished/reinitialized by the remote processing functionality 204. The quota management module 408 may reinitialize the ICS parameter after a prescribed reporting period has transpired (e.g., at the end of each month, in one representative case).

A battery management module 410 receives the battery level from the battery level monitoring module 320. The battery management module 410 compares this battery level with respect to a prescribed threshold. If the battery level falls below the threshold, then the battery management module 410 will suspend further probing/collecting operations until the battery has been recharged. In some cases, the threshold that is used for this function is the same for every user device. In other cases, the assignment management module 208 can assign different thresholds to different user devices and/or different types of user devices.

In addition, or alternatively, the battery management module 410 can directly or indirectly monitor the amount of power consumed by the user device 300 in performing probing and collecting activities in one or more information collection sessions. The battery management module 410 can then compare this power measurement with respect to a power expenditure quota (or quotas) received from the assignment management module 208, to provide a comparison result. On the basis of that comparison result, the battery management module 410 determines whether to continue or discontinue further probing and collecting activities. More specifically, this decision can cause the battery management module 410 to discontinue probing and collecting activities even though the battery level of the user device 300 has not fallen below the first-mentioned threshold. This type of rationing behavior can be performed in addition to the above-described behavior of the quota management module 408, or instead of it. In both cases, the assignment management module 208 assigns each user device a certain amount of work relating to the probing and collecting activities; as set forth above, this work can be quantified in different ways.

An activity inference management module 412 determines the state of the user device 300 based on any available evidence. For example, the activity inference management module 412 can examine the positions collected by the user device 300 over a span of time. If these positions indicate that the user device 300 is not moving, the activity inference management module 412 can suspend further probing/collecting operations.

The activity inference management module 412 can also determine the manner in which the user device 300 is moving. For example, the activity inference management module 412 can determine the speed at which the user device 300 is moving, the mode of travel that is likely being used to transport the user device 300, and so on. The activity inference management module 412 can send this travel information to the GNSS management module 406 and/or the beacon information management module 404. These modules (404, 406) can use the travel information to govern the rate at which they generate positions. For example, these modules (404, 406) can determine positions at a first rate if the user is traveling by automobile and a second rate if the user is traveling by foot, where the first rate is higher than the second rate. The modules (404, 406) can afford to update the position of the user device 300 at a slower rate when the user is walking because the user's position can be expected to change at a relatively slow rate.

The activity inference management module 412 can also use any destination prediction functionality to predict the venue to which the user may be heading. One such destination prediction functionality that can be used is the statistical method described in U.S. Pat. No. 8,024,112, issued Sep. 20, 2011, entitled "Methods for Predicting Destinations from Partial Trajectories Employing Open-and Closed-world Modeling Methods," naming the inventors of John C. Krumm and Eric J. Horvitz. The activity inference management module 412 can use the prediction of the destination to govern any aspect of the manner in which it performs probing over the course of the path taken by the user device 300.

A main management module 414 can coordinate the activities performed by all of the individual management modules described above. For example, the main management module 414 can invoke and deactivate different individual management modules as the user advances through the regions shown in FIG. 1. This has the effect of applying different probing techniques as the user advances through different regions. The main management module 414 can also receive the venue information and quota information provided by the assignment management module 208 of the remote processing functionality 204. It can store the venue information and quota information in a data store 416.

B. Illustrative Processes

FIGS. 5-15 show procedures that explain one manner of operation of the sensor management module (SMM) 302 of FIG. 3 and the remote processing functionality 204 of FIG. 2. Since the principles underlying the operation of this functionality have already been described in Section A, certain operations will be addressed in summary fashion in this section.

Figure 5:
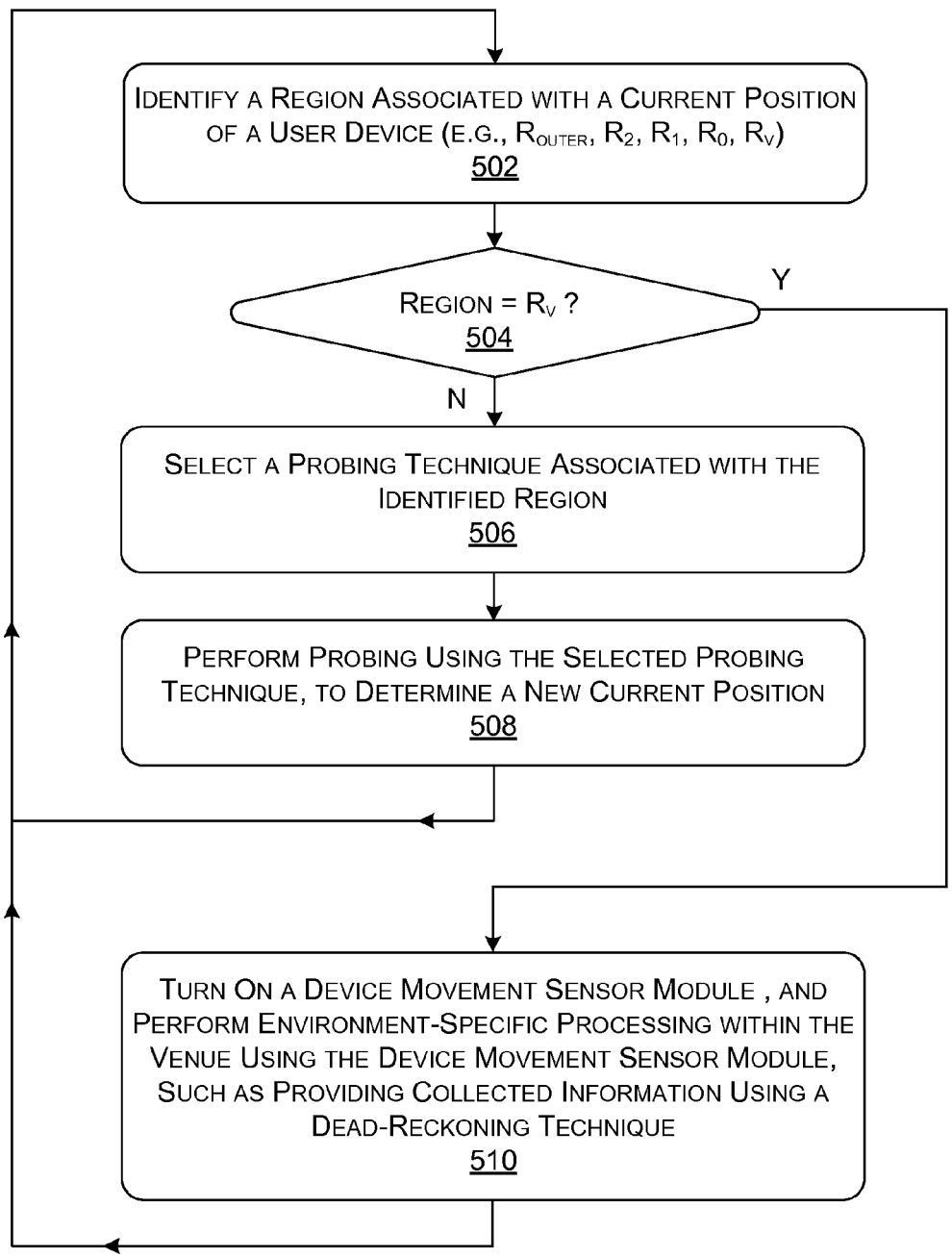
FIG. 5 shows a procedure that represents an overview of one manner of operation of the functionality described in FIGS. 1-4.

Starting with FIG. 5, this figure shows a procedure 500 that represents an overview of one manner of operation of the functionality described in FIGS. 1-4. In block 502, the sensor management module (SMM) 302 identifies a region associated with a current position of the user device 300 (e.g., corresponding to regions $R_{outer}$, $R_2$, $R_1$, $R_0$, or $R_v$) of FIG. 1. In block 504, the SMM 302 determines whether the current position lies within region $R_v$ associated with the venue 102. If so, in block 510, the SMM 302 turns on the device movement sensor module 304 and commences performing any environment-specific processing associated with the venue 102. For example, the user device 300 can perform a dead-reckoning procedure to collect positions within the venue 102. The user device 300 can then forward the positions together with beacon information (associated with each respective position) to the remote processing functionality 204.

If the current position does not lie within the region $R_v$, then, in block 506, the SMM 302 selects a probing technique associated with the identified region, e.g., by selecting a probing technique $T_{outer}$ if the region corresponds to $R_{outer}$, by selecting probing technique $T_2$ if the region corresponds to $R_2$, and so on. In block 508, the SMM 302 receives a new current position based on whatever probing technique has been chosen in block 506. The procedure 500 then advances back to block 502 to repeat the above-described process.

More specifically, as a default, the SMM 302 will initially perform block 502 in a passive manner using the opportunistic management module 402. If the position detected in this manner indicates that the user device 300 is in the $R_{outer}$ region, the SMM 302 will continue to use the opportunistic probing technique. But once the SMM 302 determines that the user device 300 is in any one of regions $R_2$, $R_1$, or $R_0$, it will then adopt an active probing technique associated with that region. At that juncture, the SMM 302 performs block 502 in an active manner until that time that it determines that the user device 100 has again moved into the $R_{outer}$ region.

As another point of clarification, the user device 300 can perform the procedure 500 with respect to any one of a subset of venues for which it has been assigned (if, in fact, it is constrained in this manner). For example, the venue that is being referenced in FIG. 5 may correspond to the venue that is closest to the user device 300. In practice, the user device 300 can compare wireless signals that it receives with respect to the venue information associated with plural venues to which it has been assigned to determine the closest venue.

Figure 6:
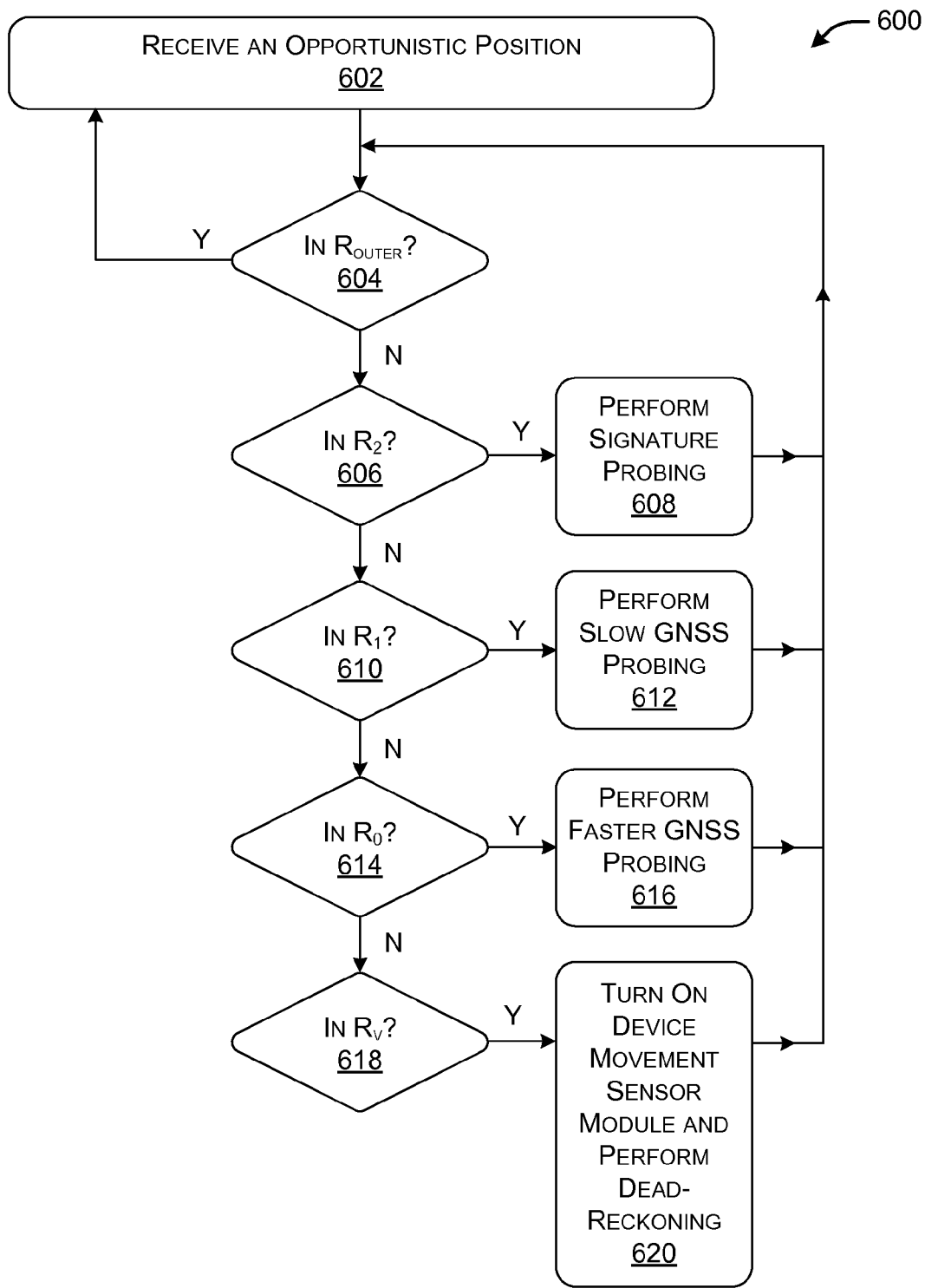
FIG. 6 shows a procedure that represents one implementation of the procedure of FIG. 5.

FIG. 6 shows a procedure 600 that represents one implementation of the procedure 500 of FIG. 5. In block 602, the SMM 302 receives an opportunistically-generated position, e.g., based on the execution of any function which obtains a position for a reason unrelated to the operation of the SMM 302, and/or in response to a manual check-in performed by the user at a particular site. In block 604, the SMM 302 determines whether the current position obtained in block 602 indicates that the user device 300 is in $R_{outer}$. If so, the SMM 302 continues using the opportunistic probing technique to monitor the position of the user device 300. (The SMM 302 can also perform the opportunistic probing technique in other regions, which supplements active probing techniques performed in those regions.)

In block 606, the SMM 302 determines whether the user device 300 is currently in the region $R_2$. If so, in block 608, the SMM 302 uses a signature probing technique to determine the position of the user device 300. This procedure involves receiving beacon information from one or more wireless communication sources (such as wireless cellular sources), comparing the beacon information to the venue information (e.g., to beacon signatures associated with the venue in question) to generate a comparison result, and generating a current approximate position based on the comparison result.

In block 610, the SMM 302 determines whether the user device 300 is currently in region $R_1$. If so, in block 612, the SMM 302 uses the GNSS module 306 to generate a current position of the user device 300. So long as the user device 300 remains in region $R_1$, the SMM 302 invokes the GNSS module 306 to provide updated positions at a frequency $f_1$.

Similarly, in block 614, the SMM 302 determines whether the user device 300 is currently in region $R_0$. If so, in block 616, the SMM 302 uses the GNSS module 306 to generate a current position of the user device 300. So long as the user device 300 remains in region $R_0$, the SMM 302 invokes the GNSS module 306 to provide updated positions at a frequency $f_0$, where $f_0 > f_1$.

In block 618, the SMM 302 determines whether the user device 300 has reached the boundary of region $R_v$, and establishes an anchor position for dead-reckoning. If so, in block 620, the SMM 302 activates the device movement sensor module 304 and commences the dead-reckoning procedure.

When the SMM 302 determines that the user device 300 has entered a new region it activates a new probing technique in the manner described above; in addition, in some cases, the SMM 302 may discontinue a probing technique that it was using in the region that it has just left. For example, a user device may move from region $R_2$ into region $R_1$, and then back into region $R_2$. Upon detecting that the user device 300 has moved back into the region $R_2$, the SMM 302 can discontinue receiving signals in an active manner using the GNSS management module 406. In another example, the SMM 302 can deactivate the movement sensor module 304 and the dead-reckoning module 308 once it determines that the user device 300 has left the venue 102 (which can be determined in any of the ways explained in Section A).

Figure 7:
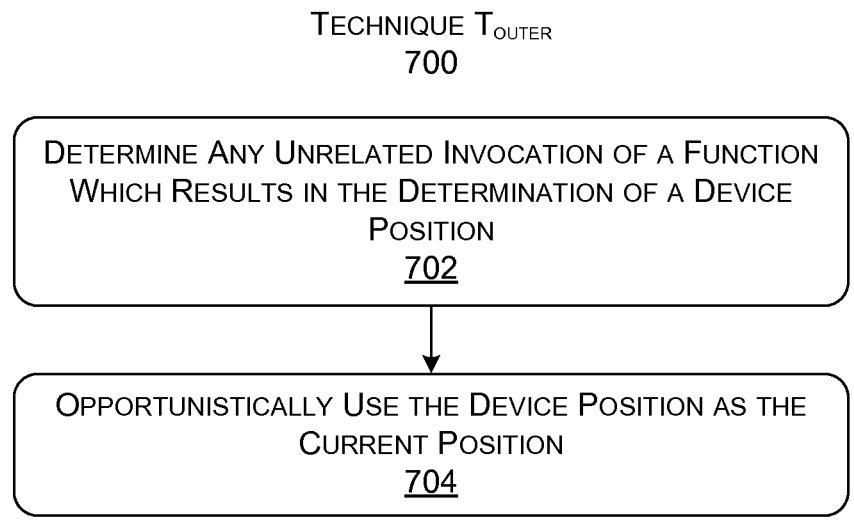
Figure 8:
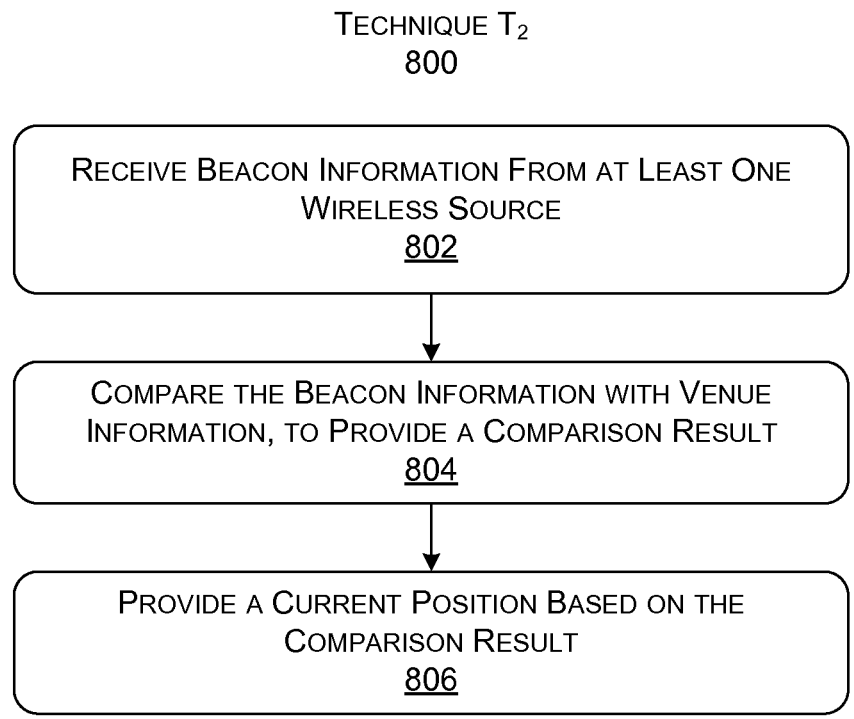

FIGS. 7-9 show three procedures (700, 800, 900) that summarize three respective probing techniques that can be performed in three respective regions. To begin with, FIG. 7 describes a procedure 700 that can be used to opportunistically determine a position within the region $R_{outer}$. In block 702, the SMM 302 detects any invocation of a function which results in the determination of a device position; that function is unrelated to the operation of the SMM 302. In block 704, the SMM 302 can parasitically use the device position as the current position of the user device 300 in the context of the processing being performed by the SMM 302. The procedure 700 of FIG. 7 can also be used in other regions (in addition to $R_{outer}$) to supplement other probing techniques used in those regions.

FIG. 8 describes a procedure 800 that can be used to determine a current position of the user device 300 within the region $R_2$. In block 802, the SMM 302 receives beacon information associated with wireless signals transmitted by at least one wireless communication source (such as at least one wireless cellular source). In block 804, the SMM 302 can compare the beacon information with venue information associated with a particular venue, to provide a comparison result. For example, block 804 can entail comparing the measured beacon information with known beacon signatures associated with the venue in question. In block 804, the SMM 302 can treat a position associated with a matching beacon signature as the approximate current position of the user device 300. In block 806, the SMM 302 can provide a current position based on the comparison result.

FIG. 9 describes a procedure 900 that can be used to determine a current position of the user device 300 within the regions $R_1$ and $R_0$. In block 902, the SMM 302 receives a GNSS-derived position from the GNSS module 306. In block 904, the SMM 302 uses the GNSS-derived position as the current position of the user device 300. The arrow which emanates from block 904 indicates that the SMM 302 repeats the procedure 900 at a frequency which depends on the distance of the user device 300 to the venue 102. In one embodiment, this feature can be performed by repeating the procedure 900 at a frequency $f_1$ for region $R_1$ and at a frequency $f_0$ for region $R_0$, where $f_1 < f_0$. The frequency can alternatively vary in a more continuous manner with respect to distance.

FIG. 10 shows a procedure 1000 that summarizes one manner of generating a position of the user device 300 based on the detection of a wireless signal transmitted by a short-range beacon. In block 1002, the SMM 302 receives a wireless signal transmitted by a short-range beacon. In block 1004, the SMM 302 identifies the short-range beacon that has transmitted the wireless signal, along with its associated known position. In some cases, the position associated with the short-range beacon is encoded in the wireless signals transmitted by the short-range beacon. In other cases, the position associated with the short-range beacon can be generated by mapping the identity of the short-range beacon to its position (e.g., by consulting a local or remote database which provides that information). In block 1006, the SMM 302 uses the known position of the short-range beacon as the current position of the user device 300.

Figure 11:
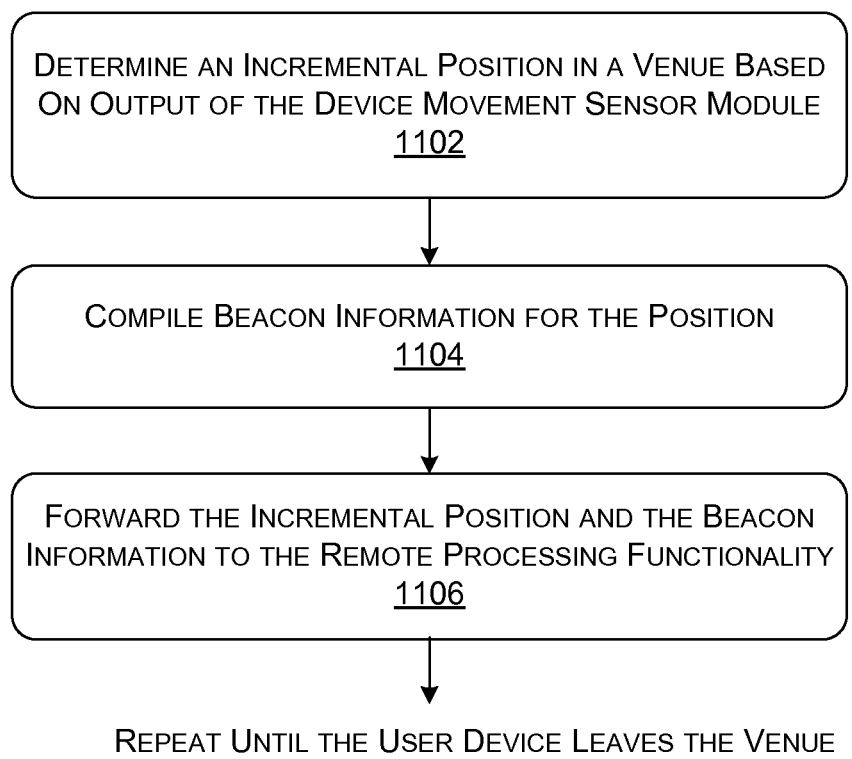
FIG. 11 shows a procedure for supplying collected information to remote processing functionality once the user device has entered a venue.

FIG. 11 shows a procedure 1100 that summarizes one manner of supplying collected information once the user device 300 has entered a venue. In block 1102, the user device 300 uses a dead-reckoning technique to determine an incremental position in the venue 102 based on an output of the device movement sensor module 304. In block 1104, the user device 300 provides beacon information which describes the identities and strengths of wireless signals that are received at the identified position. In block 1106, the user device 300 forwards the incremental position and the beacon information to the remote processing functionality 204. This information constitutes collected information according to the terminology used herein for use in a crowd-sourcing operation. The user device 300 can send the collected information in any manner, e.g., in a continuous real-time or near-real-time manner, and/or in batches. The user device 300 can proactively send the collected information to the remote processing functionality 204, and/or the remote processing functionality 204 can perform polling to receive this information.

More generally, each user device 300 can supply collected information as it traverses any of the regions associated with the environment 100 of FIG. 1, not just the region $R_v$ associated with the venue 102. As described in Section A, the remote processing functionality 204 can use this information to determine (and periodically update) various aspects of the venue information.

Figure 12:
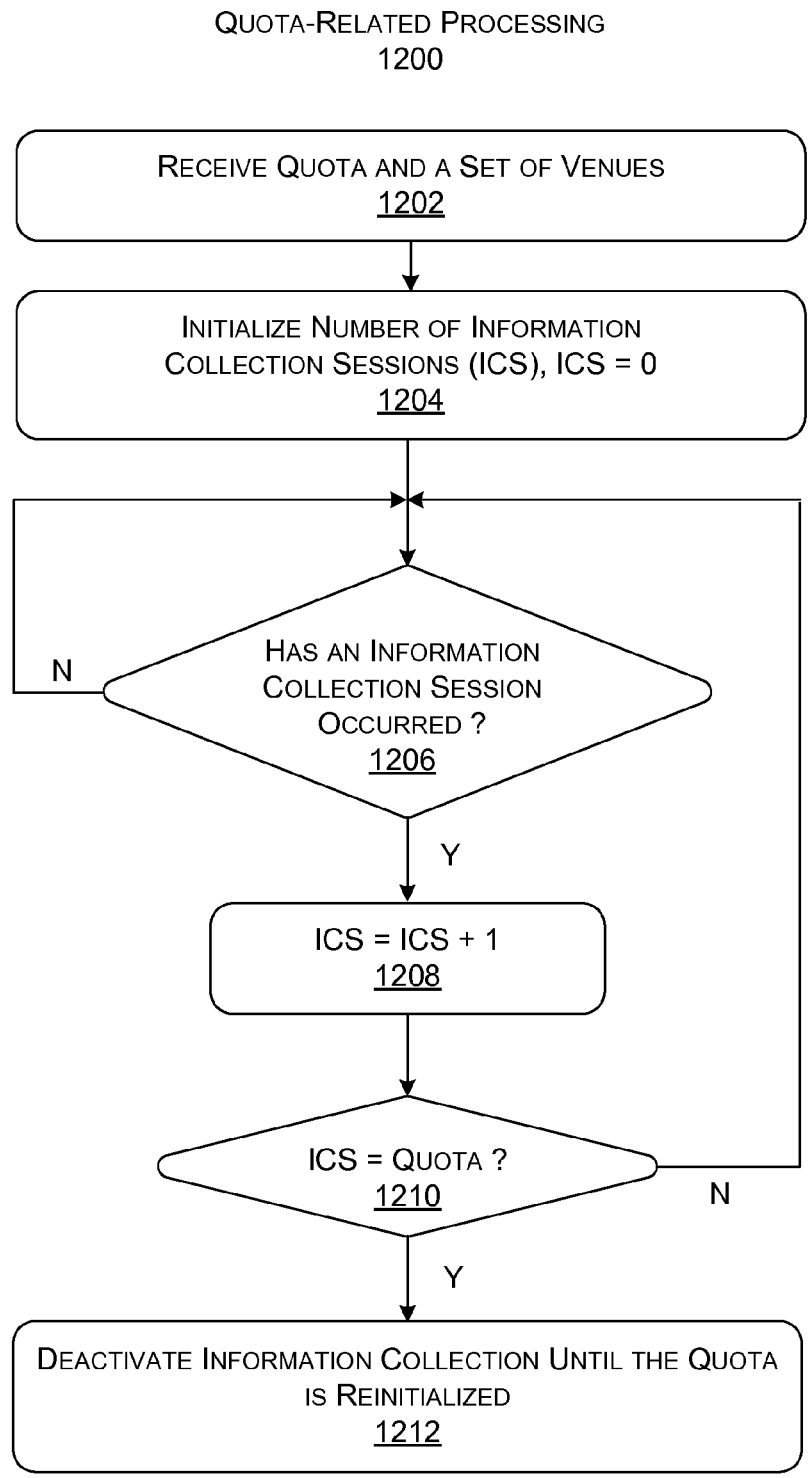
FIG. 12 shows a procedure for controlling the processing shown in FIG. 5 based on a received quota. The quota defines a maximum number of information collection sessions that the user device is asked to perform within a prescribed period of time and/or within the bounds of other specified constraining conditions.

FIG. 12 shows a procedure 1200 for performing quota-related processing. In block 1202, the user device 300 receives a quota and a set of venues. In one implementation, the quota describes a maximum number of information collection sessions (ICSs) that the user device 300 is allowed to perform within a prescribed period of time. In block 1204, the SMM 302 initializes the actual number of ICSs that have been performed to 0. In block 1206, the SMM 302 determines whether an ICS has been performed. As described in Section A, the user device 300 is considered to have performed an ICS when it has reached an ICS-triggering region, such as the region $R_1$. The path taken by the user device 100 after this point may not lead into the $R_v$ region, and hence may not involve activation of the dead-reckoning process; all the same, the SMM 102 can count this event as an ICS that has been performed. However, this ICS-counting behavior can be modified in any manner, such as by incrementing the number of actual ICSs that have been performed only upon encountered a productive (data-bearing) ICS, or by incrementing the number of actual ICSs in a weighted/discounted manner upon encountering an unproductive ICS, and so on. In block 1208, the SMM 302 increments the number of actual ICSs that have been performed in any of the ways described above. In block 1210, the SMM 302 determines whether the number of actual ICSs equals the quota. If not, then SMM 302 returns to block 1206. In block 1212, if the number of actual ICSs equals the quota, then the SMM 302 suspends the iterative probing and collecting operations until the quota is reinitialized.

More generally stated, the SMM 302 can receive one or more quotas which describe an amount of work it is allowed to perform in connection with probing and collecting activities. The SMM 302 monitors the amount of work it has actually performed in connection with these activities and terminates these activities once it reaches the applicable threshold(s). In the above example, the amount of work is quantified based a number of ICS sessions that have been performed. In addition, or alternatively, the amount of work can be assessed based on the amount of power expended by the user device 100 in performing the probing and collecting activities, e.g., as assessed based on battery level, processing load, processing time, etc.

Figure 13:
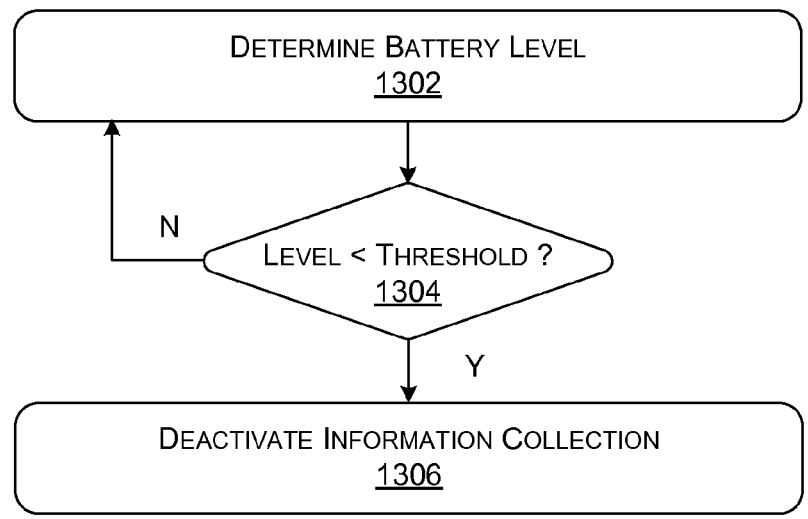
FIG. 13 shows a procedure for controlling the processing shown in FIG. 5 based on battery level.

FIG. 13 shows a procedure 1300 for controlling the processing shown in FIG. 5 based on battery level. In block 1302, the battery level monitoring module 320 determines the level of the battery 322. In block 1304, the SMM 302 determines whether the level is below a prescribed threshold. In block 1306, the SMM 302 suspends the probing and collecting operations until the battery is recharged.

Figure 14:
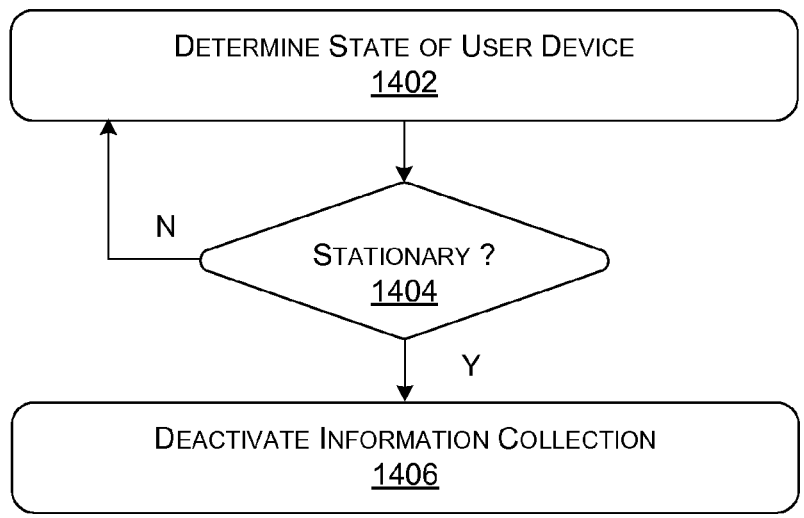
FIG. 14 shows a procedure for controlling the processing shown in FIG. 5 based on an inferred state of the user device.

FIG. 14 shows a procedure 1400 for controlling the processing shown in FIG. 5 based on an inferred state of the user device 300. In block 1402, the SMM 302 determines a state of the user device 300. The state may indicate whether the user device 300 is moving or stationary, and, if moving, the manner in which it is moving. In block 1404, the SMM 302 determines whether the user device 300 is stationary. If so, in block 1406, the SMM 302 can suspend the probing and collecting operations until the user device 300 again begins to move. As described in Section A, the SMM 302 can also use the manner in which the user device 300 is moving and/or the destination to which the user device 300 is likely headed to govern the rate at which it performs probing for positions in certain regions and/or other probing-related behavior.

Figure 15:
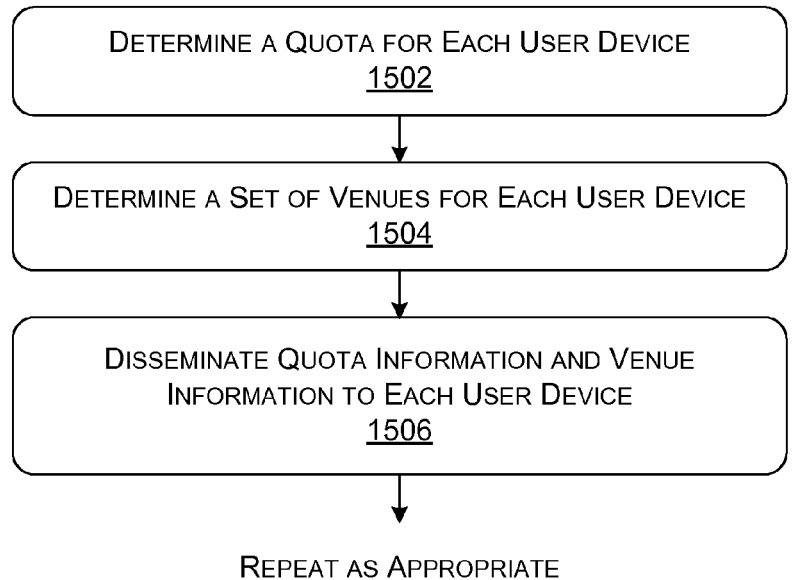
FIG. 15 shows a procedure performed by remote processing functionality for disseminating quota information and venue information to a group of user devices.

FIG. 15 shows a procedure 1500 performed by the remote processing functionality 204 for disseminating quotas and venue information to a group of user devices. In block 1502, the assignment management module 208 determines a quota (or quotas) for each user device. In block 1504, the assignment management module 208 assigns a set of venues to each user device, where each set includes one or more venues. In block 1506, the assignment management module 208 disseminates quota information and venue information to user devices. The quota information conveys the quota assigned to each user device, while the venue information conveys the set of venues assigned to each user device, along with information that characterizes those venues. For example, assume that a group of user devices is asked to perform information collection for venues A, B, and C, but not more than five times within a prescribed period. In this case, the assignment management module 208 can download quota information which identifies a quota of 5, together with venue information associated with venues A, B, and C. The assignment management module 208 can also send any other instructions, quotas, and/or settings to user devices, as specified in Section A.

Figure 16:
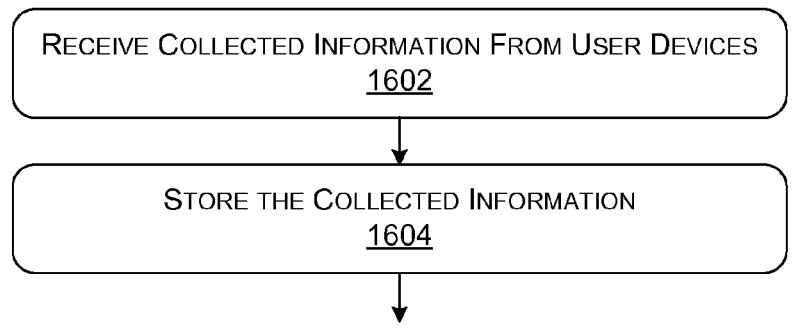
FIG. 16 shows a procedure performed by the remote processing functionality for receiving collected information from user devices.

FIG. 16 shows a procedure 1600 performed by the remote processing functionality 204 for receiving collected information from the user devices. In block 1602, the data collection module 212 receives collected information from the user devices, e.g., using a push technique, a pull technique, or combination thereof. In block 1604, the data collection module 212 stores the collected information in the data store 214.

C. Representative Computing functionality

FIG. 17 sets forth illustrative computing functionality 1700 that can be used to implement any aspect of the functions described above. For example, the type of computing functionality 1700 shown in FIG. 17 can be used to implement any aspect of any user device, such as the user device 300 of FIG. 3. Further, the type of computing functionality 1700 shown in FIG. 17 can also be used to implement any aspect of the remote computing functionality. In one case, the computing functionality 1700 may correspond to any type of computing device that includes one or more processing devices. In all cases, the computing functionality 1700 represents one or more physical and tangible processing mechanisms.

The computing functionality 1700 can include volatile and non-volatile memory, such as RAM 1702 and ROM 1704, as well as one or more processing devices 1706 (e.g., one or more CPUs, and/or one or more GPUs, etc.). The computing functionality 1700 also optionally includes various media devices 1708, such as a hard disk module, an optical disk module, and so forth. The computing functionality 1700 can perform various operations identified above when the processing device(s) 1706 executes instructions that are maintained by memory (e.g., RAM 1702, ROM 1704, or elsewhere).

More generally, instructions and other information can be stored on any computer readable medium 1710, including, but not limited to, static memory storage devices, magnetic storage devices, optical storage devices, and so on. The term computer readable medium also encompasses plural storage devices. In all cases, the computer readable medium 1710 represents some form of physical and tangible entity.

The computing functionality 1700 also includes an input/output module 1712 for receiving various inputs (via input modules 1714), and for providing various outputs (via output modules). One particular output mechanism may include a presentation module 1716 and an associated graphical user interface (GUI) 1718. The computing functionality 1700 can also include one or more network interfaces 1720 for exchanging data with other devices via one or more communication conduits 1722. One or more communication buses 1724 communicatively couple the above-described components together.

The communication conduit(s) 1722 can be implemented in any manner, e.g., by a local area network, a wide area network (e.g., the Internet), etc., or any combination thereof. As noted above in Section A, the communication conduit(s) 1722 can include any combination of hardwired links, wireless links, routers, gateway functionality, name servers, etc., governed by any protocol or combination of protocols.

Alternatively, or in addition, any of the functions described in Sections A and B can be performed, at least in part, by one or more hardware logic components. For example, without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In closing, functionality described herein can employ various mechanisms to ensure the privacy of user data maintained by the functionality. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have described various concepts in the context of illustrative challenges or problems. This manner of explanation does not constitute an admission that others have appreciated and/or articulated the challenges or problems in the manner specified herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented by one or more processing devices, the method comprising:
    identifying a first identified region based on a first distance of a current position of a user device from a venue, the first identified region being one of a plurality of regions with respective distances from the venue;
    selecting a first probing technique associated with the first identified region, the selecting based in part on the first distance of the user device from the venue, wherein the first probing technique is not associated with a second identified region associated with the venue; and
    performing the first probing technique while the user device is in the first identified region to determine a new current position of the user device.

2. The method of claim 1, further comprising:
    repeatedly identifying other identified regions associated with subsequent current positions, selecting other probing techniques associated with the other identified regions, and performing the other probing techniques to determine the subsequent current positions until it is determined, based on the subsequent current positions, that the user device has reached the second identified region associated with the venue; and
    turning on a device movement sensor module of the user device when it is determined that the user device has reached the second identified region associated with the venue.

3. The method of claim 2, further comprising using at least a dead-reckoning technique within the venue to determine a series of positions that are traversed by the user device within the venue, based on output of the device movement sensor module.

4. The method of claim 3, further comprising:
    collecting information regarding the series of the positions determined by the dead-reckoning technique within the venue, together with beacon information associated with the series of the positions, to provide collected information; and
    sending the collected information to remote processing functionality.

5. The method of claim 1, wherein the first probing technique comprises:
    determining that functionality is invoked which assesses a position of the user device for a purpose that is unrelated to said probing, to provide an assessed position,
    the assessed position comprising the new current position of the user device.

6. The method of claim 1, wherein the first probing technique comprises:
    determining that a user has checked in at a particular site; and
    identifying a site position associated with the particular site, the new current position of the user device comprising the site position.

7. The method of claim 1, wherein the first probing technique comprises:
    receiving beacon information associated with at least one wireless signal source;
    comparing the beacon information with venue information associated with the venue to provide a comparison result; and providing the new current position based on the comparison result.

8. The method of claim 1, wherein the first probing technique comprises:
determining the new current position from a global navigation satellite system (GNSS).

9. The method of claim 1, further comprising:
detecting a wireless signal transmitted by a short-range beacon; and
determining the current position of the user device based on a known position associated with the short-range beacon.

10. The method of claim 1, further comprising updating a frequency at which updated current positions are generated using the first probing technique, the updating depending on a current distance between the user device and the venue.

11. The method of claim 1, further comprising updating a frequency at which updated current positions are generated using the first probing technique, the updating depending on a manner in which the user device is moving.

12. The method of claim 1, further comprising:
receiving venue information associated with other venues; and
performing the method with respect to the other venues.

13. The method of claim 1, further comprising:
receiving a quota, the quota defining an amount of work to be performed by the user device in association with one or more information collection sessions; and
terminating said performing of the first probing technique when an amount of work that has been performed meets the quota.

14. The method of claim 1, further comprising:
determining a battery level of the user device; and
terminating said performing of the first probing technique when the battery level is below a prescribed threshold.

15. The method of claim 1, further comprising:
inferring a state of the user device; and
terminating said performing of the first probing technique when the state indicates that the user device is not moving.

16. A user device comprising:
at least one processing device;
at least one movement sensor device; and
at least one storage device storing computer-executable instructions which, when executed by the at least one processing device, cause the at least one processing device to:
receive venue information associated with at least one venue;
determine a current position of the user device using at least one probing technique;
determine, based on the current position, that the user device has reached a prescribed region associated with the at least one venue;
in response to the user device having reached the prescribed region, turn on the device at least one movement sensor device of the user device; and
activate a dead-reckoning technique to generate subsequent positions using the at least one movement sensor device.

17. The user device of claim 16, wherein the computer-executable instructions further cause the at least one processing device to:
receive a quota, the quota defining an amount of work to be performed by the user device in association with one or more information collection sessions; and
provide collected information to remote processing functionality based on the subsequent positions generated by the dead-reckoning technique, providing that a current amount of work that has been performed is below the quota.

18. A computer readable memory device or storage device storing computer readable instructions that, when executed by one or more processing devices, cause the one or more processing devices to perform acts comprising:
determining a venue to assign to an individual user device, the venue corresponding to a region in which the individual user device is asked to provide collected information, the collected information comprising positions in association with beacon information;
determining a quota for the individual user device, the quota defining an amount of work that the individual user device is allowed to perform in collecting the collected information;
sending venue information and a description of the quota to the individual user device, the venue information reflecting the venue assigned to the individual user device; and
receiving the collected information from the individual user device, the collected information being collected by the individual user device within the venue.

19. The computer readable memory device or storage device of claim 18, the acts further comprising defining at least one characteristic of the venue information associated with the venue, based on crowd-sourced collected information received from the individual user device and at least one other user device.

20. The computer readable memory device or storage device of claim 18, the acts further comprising conferring at least one reward to a user associated with the individual user device in response to receipt of the collected information from the individual user device, indicating that the individual user device has entered the venue assigned to the individual user device.

* * * * *